United States Patent
Kawai et al.

[19]

[11] Patent Number: 6,148,318
[45] Date of Patent: Nov. 14, 2000

[54] SQUARE ROOT EXTRACTION CIRCUIT AND FLOATING-POINT SQUARE ROOT EXTRACTION DEVICE

[75] Inventors: Hiroyuki Kawai; Robert Streitenberger; Yoshitsugu Inoue; Hiroyuki Morinaka, all of Tokyo, Japan

[73] Assignee: Mitsubishi Denki Kabushiki Kaisha, Tokyo, Japan

[21] Appl. No.: 08/964,888

[22] Filed: Nov. 5, 1997

[30] Foreign Application Priority Data

May 8, 1997 [JP] Japan ................................. 9-118215

[51] Int. Cl.[7] ........................................................ G06F 7/38
[52] U.S. Cl. .......................................................... 708/605
[58] Field of Search ...................................... 708/510, 605

[56] References Cited

U.S. PATENT DOCUMENTS

| | | | |
|---|---|---|---|
| 4,748,581 | 5/1988 | DeTroye | 708/605 |
| 5,128,891 | 7/1992 | Lynch et al. | |
| 5,331,586 | 7/1994 | Kitora | |
| 5,430,669 | 7/1995 | Chen et al. | 708/605 |

FOREIGN PATENT DOCUMENTS 4-257024  9/1992  Japan.

OTHER PUBLICATIONS

"Computer High–speed Operation System," Kindai Kagaku sha Co., Ltd., Sep. 1, 1980, pp. 357–363, 42–43). (English Language Abstract Attached).

*Primary Examiner*—Chuong Dinh Ngo
*Attorney, Agent, or Firm*—Burns, Doane, Swecker & Mathis, LLP

[57] ABSTRACT

A square root extraction circuit and a floating-point square root extraction device which simplify a circuit structure and improve an operation speed are provided. Portions for generating square root partial data (q3 to q8) include carry output prediction circuits (3 to 8), respectively. The carry output prediction circuit (i) (i equals any one of 3 to 8) receives condition flags (AHin, ALin), the most significant addition result (SUM), and square root partial data (q(i−1)) from the preceding square root partial data generating portion, and also receives a carry input (Cin) to output condition flags (AHout, ALout) for the next square root partial data generating portion, and square root partial data (q(i)). The condition flags (AHout, ALout) serve as the condition flags (AHin, ALin) for the carry output prediction circuit (i+1), respectively.

11 Claims, 20 Drawing Sheets

SQUARE ROOT EXTRACTION CIRCUIT AND FLOATING-POINT SQUARE ROOT EXTRACTION DEVICE

BACKGROUND OF THE INVENTION

1. Field of the Invention

The present invention relates to a square root extraction algorithm and a square root extraction circuit used for three-dimensional graphics processing which requires numerical calculations, particularly vector normalization.

2. Description of the Background Art

Graphics processing employing vector normalization, principally light source calculations, uses the result of vector normalization (X|SQRT(X) where X is a vector and SQRT (X) is the square root of X) for processing. Thus, the increase in operation speed of the normalization is significant to increase the light source calculating speed. Attempts have been made to implement a square root extraction operation via software or special-purpose hardware. The software for the square root extraction operation requires no special hardware structure and hence necessitates no consideration for a circuit size (costs) when the LSI technique is applied thereto, but requires a large number of repetitive operations using an approximation algorithm. For this reason, the special-purpose hardware is used when a higher priority is given to a processing speed.

However, a conventional square root extraction circuit employing the square root extraction algorithm which determines conventional non-recovery type square roots has a hardware structure as disclosed in "Computer High-speed Operation System," Kindai Kagaku Sha Co., Ltd. Thus, to determine an N-digit square root, the conventional square root extraction circuit is subject to the following restrictions:

(1) $N \cdot (N+1)/2$ adders are required.

(2) CAS cells (controllable add/subtract cells) must be used which have a more complicated internal structure as one-unit adders than do full adders.

(3) The operation of a digit of a given significance is not permitted to start until a carry output from the highest-order adder for the digit of the next higher significance (an extracted square root output for that digit) is determined. This decreases the operation speed.

The drawback (2) is described in detail hereinafter.

The CAS cell is a 4-input 4-output controllable add/subtract cell which receives data inputs A, B, a carry input CI, and a control input P to provide an addition (subtraction) output S and a carry output CO which satisfy the conditions described below, a data output B (equal to the data input B), and a control output P (equal to the control input P).

$$S = A \char`\^ (B \char`\^ P) \char`\^ CI$$

$$CO = (A+C) \cdot (B \char`\^ P) + A \cdot C$$

The symbol "^" means an exclusive-OR operation. The control input (output) P indicates an addition when it is "0", and indicates a subtraction when it is "1". In this manner, the CAS cell is a circuit which functions to perform a 1-bit addition/subtraction.

To determine the binary square root $Q = \{0.q1\ q2\ q3\ q4\}_2$ of a binary number $A = \{0.a1\ a2\ a3\ a4\ a5\ a6\ a7\ a8\}_2$, the conventional square root extraction algorithm determines whether the calculation for a digit of a given significance $q(i+1)$ employs an addition or a subtraction, depending upon whether the value of the output digit of the next higher significance $q(i)$ is "1" or "0". Thus, the conventional square root extraction circuit constructed such that the value of the square root extraction output digit of a given significance $q(i)$ selectively determines the operation contents (addition or subtraction) in the CAS cells for the digit of the next lower significance $q(i+1)$ is slow in operation speed and requires the CAS cells having the 1-bit addition/subtraction function.

FIG. 22 is a diagram of a square root extraction circuit employing the conventional algorithm.

As illustrated, two CAS cells are used for the output q1, four CAS cells for the output q2, six CAS cells for the output q3, and eight CAS cells for the output q4. In FIG. 22, an input shown as given to the middle of the top side of the block of each CAS cell corresponds to the data input A, an input shown as given obliquely to the upper-left corner of the block corresponds to the data input B, an input shown as given across the block corresponds to the control input P, an input shown as given to the right side of the block corresponds to the carry input CI, an output shown as provided from the left side of the block corresponds to the carry output CO, and an output shown as provided from the middle of the bottom side of the block corresponds to the addition (subtraction) output S. The CAS cell has a greater circuit size than that of a full adder and a half adder which are simple in construction, resulting in a complicated circuit structure of the conventional square root extraction circuit.

SUMMARY OF THE INVENTION

A first aspect of the present invention is intended for a square root extraction circuit for calculating binary input data $(0.a(1)\ a(2)\ a(3)\ldots a(n))$ using a square root extraction algorithm to output binary square root data $(0.q(1)\ q(2)\ q(3)\ldots q(m))$, the square root extraction algorithm including an algorithm for determining the square root data on the basis of the input data by only additions of square root partial data $q(1)$ to $q(m)$ in $q(1)$ to $q(m)$ order. According to the present invention, the square root extraction circuit comprises: first to mth digit calculating portions each including a plurality of adders connected in series so that carries are propagated therethrough, wherein respective ones of the adders which are connected in the last position in the first to mth digit calculating portions provide carry outputs serving as the square root partial data $q(1)$ to $q(m)$, respectively, in accordance with the square root extraction algorithm.

A second aspect of the present invention is intended for a square root extraction circuit for calculating binary input data $(0.a(1)\ a(2)\ a(3)\ldots a(n))$ using a square root extraction algorithm to output binary square root data $(0.q(1)\ q(2)\ q(3)\ldots q(m))$, the square root extraction algorithm including an algorithm for determining the square root data on the basis of the input data by only additions of square root partial data $q(1)$ to $q(m)$ in $q(1)$ to $q(m)$ order, the algorithm having preceding digit based operation portions for performing operations to output the square root partial data $q(2)$ to $q(m)$ by using the square root partial data $q(1)$ to $q(m-1)$ provided in their preceding digit positions as operation parameters. According to the present invention, the square root extraction circuit comprises: first to mth digit calculating portions including at least first to mth adder groups, respectively, each of the first to mth adder groups including a plurality of adders connected in series so that carries are propagated therethrough, wherein respective ones of the adders which are connected in the last position in the first to (p−1)th digit calculating portions ($2 \leq p \leq m$) provide carry outputs serving as the square root partial data $q(1)$ to $q(p-1)$, respectively, in accordance with the square root extraction algorithm, and wherein the preceding digit based operation portions of the pth to nith digit calculating portions include carry output prediction circuits for performing logic operations based on the carry outputs from respective ones of the adders which are connected in the last position in the adder groups thereof and the square root partial data q(p−1) to q(m−1) provided in their preceding digit positions to output the square root partial data q(p) to q(m), respectively.

Preferably, according to a third aspect of the present invention, the square root extraction circuit of the second aspect further comprises: a rounding circuit for rounding square root data (0.q(1) q(2) q(3) . . . q(k−1)) (p≦k≦m) based on the square root partial data q(k) to q(m) outputted from the carry output prediction circuits of the kth to mth digit calculating portions to output rounded square root data (0.r(1) r(2) r(3) . . . r(k−1)).

Preferably, according to a fourth aspect of the present invention, in the square root extraction circuit of the second aspect, each of the second to mth adder groups comprises at least a pair of adders receiving respective external data, and at least a pair of adders each having a first input receiving an addition result from an adder included in an adder group provided in its preceding digit position, the two pairs of adders being connected in series so that carries are propagated therethrough; the carry output prediction circuit of the pth digit calculating portion performs a logic operation based on addition result information containing information associated with at least an addition result from the adder connected in the last position in the (p−1)th adder group in addition to the carry output from the adder connected in the last position in the pth adder group and the square root partial data q(p−1) provided in its preceding digit position, thereby to output the square root partial data q(p) and addition result information of the pth digit calculating portion; and the carry output prediction circuit of the ith digit calculating portion ((p+1)≦i≦m) performs a logic operation based on an addition result from the adder connected in the last position in the (i−1)th adder group and the addition result information of the (i−1)th digit calculating portion in addition to the carry output from the adder connected in the last position in the ith adder group and the square root partial data q(i−1) provided in its preceding digit position, thereby to output the square root partial data q(i) and addition result information of the ith digit calculating portion.

Preferably, according to a fifth aspect of the present invention, in the square root extraction circuit of the second aspect, each of the second to mth adder groups comprises at least a pair of adders receiving respective external data, and at least a pair of adders each having a first input receiving, an addition result from an adder included in an adder group provided in its preceding digit position, the two pairs of adders being connected in series so that carries are propagated therethrough; the carry output prediction circuit of the pth digit calculating portion performs a logic operation based on addition result information containing information associated with at least an addition result from the adder connected in the last position in the (p−1)th adder group in addition to the carry output from the adder connected in the last position in the pth adder group and the square root partial data q(p−1) provided in its preceding digit position, thereby to output the square root partial data q(p) and addition result information of the pth digit calculating portion; the carry output prediction circuit of the ith digit calculating portion ((p+1)≦i≦(m−1)) performs a logic operation based on an addition result from the adder connected in the last position in the (i−1)th adder group and the addition result information of the (i−1)th digit calculating portion in addition to the carry output from the adder connected in the last position in the ith adder group and the square root partial data q(i−1) provided in its preceding digit position, thereby to output the square root partial data q(i) and addition result information of the ith digit calculating portion; and the carry output prediction circuit of the mth digit calculating portion performs a logic operation based on an addition result from the adder connected in the last position in the mth adder group and the addition result information of the (m−1)th digit calculating portion in addition to the carry output from the adder connected in the last position in the (m−1)th adder group and the square root partial data q(m−1) provided in its preceding digit position, thereby to output only the square root partial data q(m).

Preferably, according to a sixth aspect of the present invention, in the square root extraction circuit of the fourth aspect, the carry output prediction circuit of the ith digit calculating portion ((p+1)≦i≦m) comprises: logic operation means for performing the logic operation based on the addition result from the adder connected in the last position in the (i−1)th adder group and the addition result information of the (i−1)th digit calculating portion to output a plurality of logic results; and selection means for selectively outputting one of the logic results as the square root partial data q(i) and another one of the logic results as the addition result information of the ith digit calculating portion on the basis of the carry output from the adder connected in the last position in the ith adder group and the square root partial data q(i−1) provided in its preceding digit position.

Preferably, according to a seventh aspect of the present invention, in the square root extraction circuit of the sixth aspect, the selection means receives the carry output having a negative logic from the adder connected in the last position in the ith adder group.

Preferably, according to an eighth aspect of the present invention, in the square root extraction circuit of the second aspect, the square root extraction algorithm includes a step for adding fixed values to be added; and a fixed addition result is directly applied to an adder in each of the first to mth digit calculating portions without using an adder for adding the fixed values.

A ninth aspect of the present invention is intended for a floating-point square root extraction device for performing a square root extraction operation on floating-point input data including a mantissa and an exponent to output floating-point output data. According to the present invention, the floating-point square root extraction device comprises: exponent square root extraction means receiving exponent input data for performing the square root extraction operation on the exponent input data to output exponent square root data; a square root extraction circuit for calculating binary input data associated with mantissa input data (0.a(1) a(2) a(3) . . . a(n)) using a square root extraction algorithm to output mantissa square root data (0.q(1) q(2) q(3) . . . q(m)), the square root extraction algorithm including an algorithm for determining the mantissa square root data on the basis of the input data by only additions of square root partial data q(1) to q(m) in q(1) to q(m) order, the algorithm having preceding digit based operation portions for performing operations to output the square root partial data q(2) to q(m) by using the square root partial data q(1) to q(m−1) provided in their preceding digit positions as operation parameters, the square root extraction circuit comprising first to mth digit calculating portions including at least first to mth adder groups, respectively, each of the first to mth adder groups including a plurality of adders connected in series so that carries are propagated therethrough, wherein respective ones of the adders which are connected in the last position in the first to (p−1)th digit calculating portions (2≦p≦m) provide carry outputs serving as the square root partial data q(1) to q(p−1), respectively, in accordance with the square root extraction algorithm, and wherein the preceding digit based operation portions of the pth to mth digit calculating portions include carry output prediction circuits for performing logic operations based on the carry outputs from respective ones of the adders which are connected in the last position in the adder groups thereof and the square root partial data q(p−1) to q(m−1) provided in their preceding digit positions to output the square root partial data q(p) to q(m), respectively, the floating-point square root extraction device further comprising floating-point data output means for outputting the floating-point output data including exponent output data and mantissa output data on the basis of the exponent square root data and the mantissa square root data.

Preferably, according to a tenth aspect of the present invention, in the floating-point square root extraction device of the ninth aspect, the floating-point data output means includes output selection means receiving input data information indicating whether the floating-point input data is a normalized number or an unnormalized number, the output selection means for forcing the exponent output data to be "0" to output only the mantissa output data as the floating-point output data when the input data information indicates the unnormalized number.

Preferably, according to an eleventh aspect of the present invention, the floating-point square root extraction device of the ninth aspect further comprises: data shift means for performing a predetermined data shift processing on the mantissa input data to apply the resultant data as the binary input data to the square root extraction circuit when the exponent input data is an odd number, wherein the exponent square root extraction means includes: preliminary exponent square root extraction portion for performing a predetermined change-to-even-number processing on the exponent input data to provide an even number when the exponent input data is an odd number, the preliminary exponent square root extraction portion thereafter dividing the even number by 2 to output preliminary exponent square root data, the change-to-even-number processing and the predetermined data shift processing being performed so that the value of the floating-point input data is not changed, and an exponent square root data output portion for modifying the preliminary exponent square root data on the basis of rounding-based carry information to output the exponent square root data, and wherein the floating-point data output means includes mantissa data rounding means for rounding more significant digits of the mantissa square root data on the basis of a less significant digit of the mantissa square root data to output the mantissa output data and to output the rounding-based carry information indicating whether or not the mantissa square root data has a carry during rounding.

Preferably, according to a twelfth aspect of the present invention, in the floating-point square root extraction device of the eleventh aspect, the preliminary exponent square root extraction portion and the exponent square root data output portion are formed integrally.

As above described, the square root extraction circuit in accordance with the first aspect of the present invention uses the carry outputs from the adders connected in the last position in the first to mth digit calculating portions as the square root partial data q(1) to q(m), respectively, in accordance with the square root extraction algorithm for determining the square root data based on the input data only by the additions of the square root partial data q(1) to q(m) in q(1) to q(m) order. The square root extraction circuit is implemented using only the existing half adders and full adders to achieve a simple circuit structure.

The square root extraction circuit in accordance with the second aspect of the present invention uses the carry outputs from the adders connected in the last position in the first to (p−1)th digit calculating portions as the square root partial data q(i) to q(p−1), respectively, in accordance with the square root extraction algorithm for determining the square root data based on the input data only by the additions of the square root partial data q(1) to q(m) in q(1) to q(m) order. The pth to nith digit calculating portions include the carry output prediction circuits for performing the logic operations based on the carry outputs from the adders connected in the last position in the adder groups thereof and the square root partial data q(p−1) to q(m−1) provided in their preceding digit positions to output the square root partial data q(p) to q(m), respectively.

The square root extraction circuit of the second aspect, similar to that of the first aspect, is implemented using only the existing half adders and full adders to achieve a simple circuit structure.

Additionally, when the preceding digit based operation portion requires a plurality of additions using the square root partial data provided in the preceding digit position as the operation parameter, the preceding digit based operation portion may be comprised of only the single carry output prediction circuit. This allows the single carry output prediction circuit to perform the function of a conventional in-series connection of a plurality of adders for implementing the plurality of additions, accomplishing a more simplified circuit structure.

Although the plurality of adders connected in series must propagate carries therethrough, the single carry output prediction circuit may perform the logic operation without the carry propagation, improving the operation speed.

The square root extraction circuit in accordance with the third aspect of the present invention further comprises the rounding circuit for rounding the square root data based on the square root partial data q(k) to q(m) outputted from the carry output prediction circuits of the kth to mth digit calculating portions. This provides the output of the square root data with the rounding function.

In the square root extraction circuit in accordance with the fourth aspect of the present invention, the carry output prediction circuit of the ith digit calculating portion ((p+1) ≦i≦m) performs the logic operation based on the addition result from the adder connected in the last position in the (i−1)th adder group and the addition result information of the (i−1)th digit calculating portion in addition to the carry output from the adder connected in the last position in the ith adder group and the square root partial data q(i−1), thereby to output the square root partial data q(i) and the addition result information of the ith digit calculating portion. Thus, the carry output prediction circuits of the (p+1)th to mth digit calculating portions may be implemented by the circuits which perform the same logic operation. The circuit size of the carry output prediction circuits is not increased if the number of digits of the square root data increases.

In the square root extraction circuit in accordance with the fifth aspect of the present invention, the carry output prediction circuit of the mth digit calculating portion performs the logic operation based on the addition result from the adder connected in the last position in the mth adder group and the addition result information of the (m−1)th digit calculating portion in addition to the carry output from the adder connected in the last position in the (m−1)th adder group and the square root partial data q(m−1), thereby to output only the square root partial data q(m).

Thus, the carry output prediction circuit of the mth digit calculating portion should perform the logic operation which outputs only the square root partial data q(m), thereby to be of a more simplified circuit construction than other carry output prediction circuits.

In the square root extraction circuit in accordance with the sixth aspect of the present invention, the selection means selectively outputs one of the logic results as the square root partial data q(i) and another one of the logic results as the addition result information of the ith digit calculating portion on the basis of the carry output from the adder connected in the last position in the ith adder group and the square root partial data q(i−1).

The carry output from the adder connected in the last position in the ith adder group and the square root partial data q(i−1) which require relatively long time to be determined are used as selection control signals after the logic operation means provides the plurality of logic results. This increase the efficiency of the processing to improve the operation speed.

The logic operation means of the square root extraction circuit in accordance with the seventh aspect of the present invention receives the carry output having the negative logic from the adder connected in the last position in the ith adder group, requiring only one inverter to buffer the carry output.

In the square root extraction circuit in accordance with the eighth aspect of the present invention, the fixed addition result is directly applied to the adder in each of the first to mth digit calculating portions without using an adder for adding the fixed values. This provides for a more simplified circuit structure.

The floating-point square root extraction device in accordance with the ninth aspect of the present invention comprises the square root extraction circuit of the first or second aspect to simplify the circuit structure of the square root extraction circuit. The use of the square root extraction circuit of the second aspect improves the operation speed of the mantissa output data.

In the floating-point square root extraction device in accordance with the tenth aspect of the present invention, the output selection means forces the exponent output data to be "0" to output only the mantissa output data as the floating-point output data when the input data information indicates the unnormalized number. This enables the square root extraction operation of the floating-point input data which is the unnormalized number.

The floating-point square root extraction device in accordance with the eleventh aspect of the present invention further comprises the data shift means for performing the predetermined data shift processing on the mantissa input data to apply the resultant data as the binary input data to the square root extraction circuit when the exponent input data is an odd number. The exponent square root extraction means includes the preliminary exponent square root extraction portion for performing the predetermined change-to-even-number processing on the exponent input data to provide an even number when the exponent input data is an odd number, the preliminary exponent square root extraction portion thereafter dividing the even number by 2 to output the preliminary exponent square root data. The change-to-even-number processing and the predetermined data shift processing are performed so that the value of the floating-point input data is not changed. This provides the efficient execution of the square root extraction operation by the preliminary exponent square root extraction portion without impairing the operation accuracy.

In the floating-point square root extraction device in accordance with the twelfth aspect of the present invention, the preliminary exponent square root extraction portion and the exponent square root data output portion are formed integrally. This accordingly simplifies the circuit structure.

It is therefore an object of the present invention to provide a square root extraction circuit which achieves a simplified circuit structure and a higher operation speed.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 illustrates a square root extraction algorithm used for a square root extraction circuit according to a first preferred embodiment of the present invention;

DESCRIPTION OF THE PREFERRED EMBODIMENTS

First Preferred Embodiment

Figure 1:
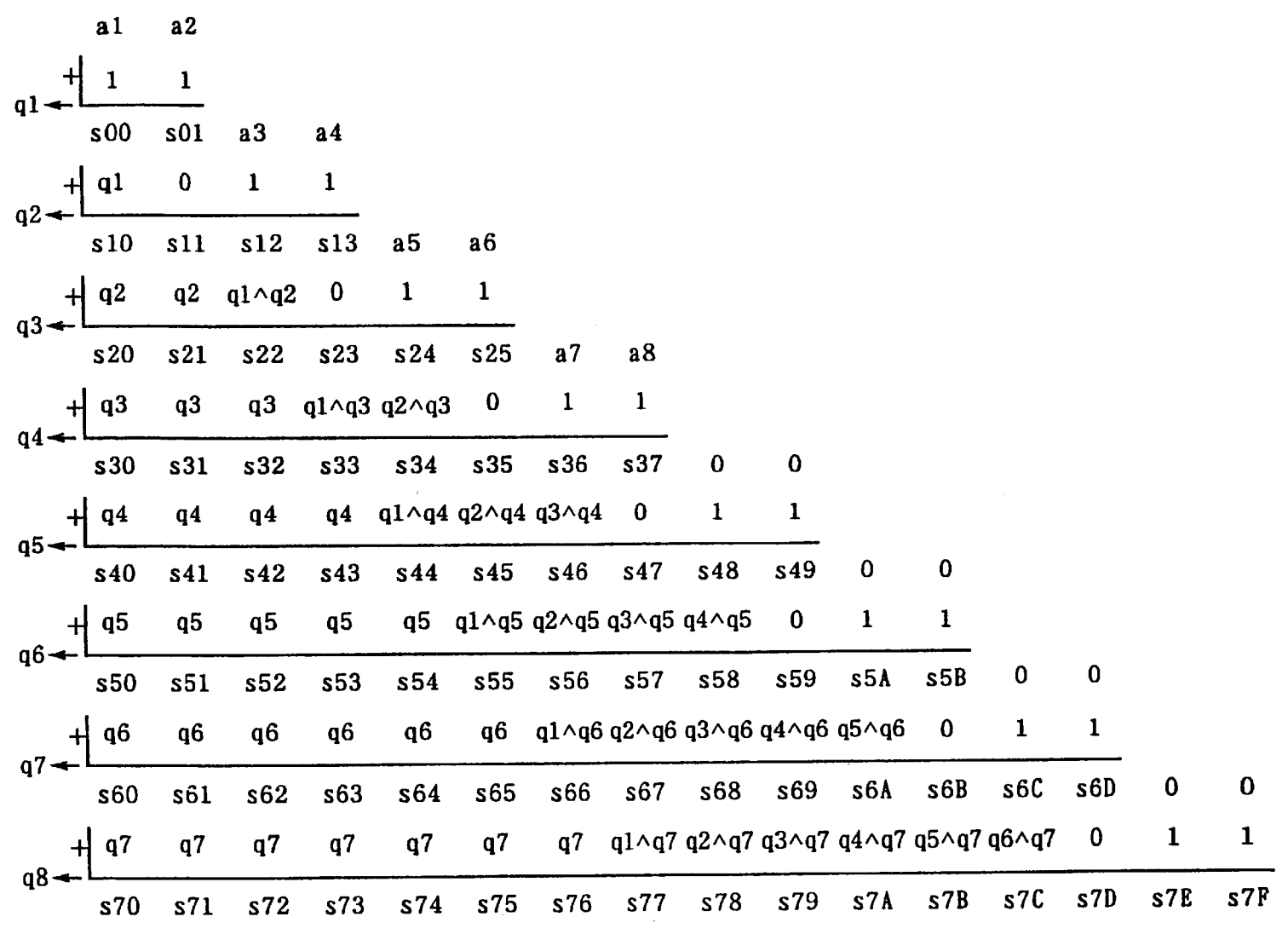
Figure 2:
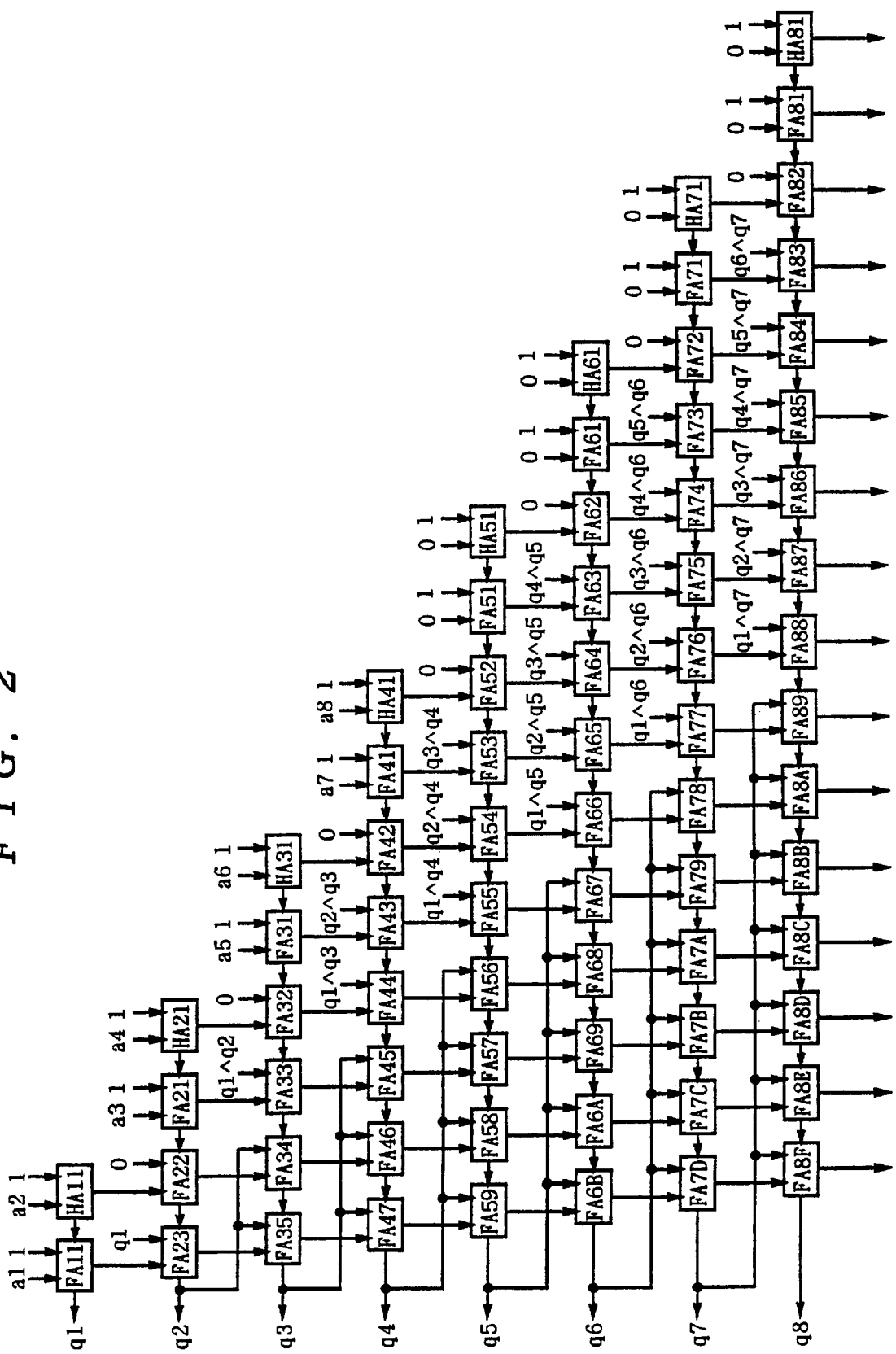
FIG. 2 is a block diagram showing an arrangement of the square root extraction circuit of the first preferred embodiment.

FIG. 1 illustrates a first square root extraction algorithm used for a square root extraction circuit according to a first preferred embodiment of the present invention. As shown in FIG. 1, input data and output data (square root extraction result) are in 8-bit fixed-point representation for purposes of illustration. That is, the algorithm shown in FIG. 1 determines the binary square root data $Q=\{0.q1\ q2\ q3\ q4\ q5\ q6\ q7\ q8\}_2$ of binary input data $A=\{0.a1\ a2\ a3\ a4\ a5\ a6\ a7\ a8\}_2$.

The first square root extraction algorithm is described below with reference to FIG. 1. The first square root extraction algorithm is derived from the modified background art algorithm.

The background art square root extraction algorithm is established by:

If $q(k)=1$, $R(k+1) \leftarrow R(k) \cdot a(2k+1)a(2k+2) - q(1)q(2) \ldots q(k-1)101$ (1)

and

If $q(k)=0$, $R(k+1) \leftarrow R(k) \cdot a(2k+1)a(2k+2) + q(1)q(2) \ldots q(k-1)011$ (2)

Since the terms on the right-hand side are based on the premise that the condition in the IF clause holds, the value corresponding to q(k) in the second term on the right-hand side has been replaced with "1" in Expression (1) and with "0" in Expression (2). To compensate for the deficit of bits in the second term on the right-hand side, "0" shall be added to the left of q(1) in the second term, as has been done in the background art algorithm. It should be noted that q(1), q(2) and the like are sometimes represented simply as q1, q2 and the like in the drawings and specification, but both representations have the same meaning.

The subtraction in Expression (1) may be replaced with the addition of two's complement in binary calculation as expressed by:

If $q(k)=1$, $R(k+1) \leftarrow R(k) \cdot a(2k+1)a(2k+2) + {}^-q(1){}^-q(2) \ldots {}^-q(k-1)011$ (3)

where $^-q(i)$ is the inverted logic of q(i). The "0" inserted into the position preceding the second term on the right-hand side for digit place alignment must also be inverted but is dispensed with herein.

The use of Expressions (2) and (3) achieves the square root extraction algorithm by using only existing adders (full adders FA and half adders HA) without using the background art CAS cells (controllable add/subtract cells). Further, it is found from Expressions (2) and (3) that the three low-order bits in the second term on the right-hand side may be fixed to the common data "011". This allows $^-q(i)$ in Expression (3) to be expressed as:

$^-q(i)=q(i)^\wedge q(k)$ $(1 \leq i \leq k-1)$ (4)

where the symbol "$^\wedge$" means an exclusive-OR operation. The "0" inserted into the position preceding the second term on the right-hand side for digit place alignment may be similarly expressed as:

$^-0 = 0^\wedge q(k) = q(k)$ (5)

The square root extraction algorithm obtained by using Expressions (2) to (5) is the algorithm illustrated in FIG. 1. Since $0^\wedge q(k)$ constantly equals q(k), the latter representation is used for simplification.

The use of the algorithm shown in FIG. 1 allows the formation of a square root extraction circuit which comprises only the existing adders (full adders FA and half adders HA) as illustrated in FIG. 2 without using the CAS circuits which have been used in the background art hardware. Circuits for performing the exclusive-OR operation such as {q1^q2} illustrated in FIG. 2 are not shown in the figures.

Referring to FIG. 2, a portion for generating the square root partial data q1 (portion for calculating the digit of the square root partial data q1) comprises a half adder HA11 and a full adder FA11 which are connected in series so that carries are propagated from the half adder HA to the full adder FA11. The half adder HA11 receives "1", and the input data a2. The full adder FA11 receives "1", and the input data a1 to provide a carry output serving as the square root partial data q1.

A portion for generating the square root partial data q2 comprises a half adder HA21 and full adders FA21–FA23 which are connected in series so that carries are propagated in the designated order from the half adder HA21 to the full adder FA23. The half adder HA21 receives "1", and the input data a4. The full adder FA21 receives "1", and the input data a3. The full adder FA22 receives "0", and the result of addition from the half adder HA11. The full adder FA23 receives the result of addition from the full adder FA11, and the output data q1 therefrom to provide a carry output serving as the square root partial data q2.

A portion for generating the square root partial data q3 comprises a half adder HA31 and full adders FA31–FA35 which are connected in series so that carries are propagated in the designated order from the half adder HA31 to the full adder FA35. The half adder HA31 receives "1", and the input data a6. The full adder FA31 receives "1", and the input data a5. The full adder FA32 receives "0", and the result of addition from the half adder HA 21. The full adder FA33 receives the exclusive-OR of the output data (q1^q2), and the result of addition from the full adder FA21. The full adder FA34 receives the square root partial data q2, and the result of addition from the full adder FA22. The full adder FA35 receives the square root partial data q2, and the result of addition from the full adder FA23 to provide a carry output serving as the square root partial data q3.

A portion for generating the square root partial data q4 comprises a half adder HA41 and full adders FA41–FA47 which are connected in series so that carries are propagated in the designated order from the half adder HA41 to the full adder FA47. The half adder HA41 receives "1", and the input data a8. The full adder FA41 receives "1", and the input data a7. The full adder FA42 receives "0", and the result of addition from the half adder HA31. The full adder FA43 receives the exclusive-OR of the output data (q2^q3), and the result of addition from the full adder FA31. The full adder FA44 receives the exclusive-OR of the output data (q1^q3), and the result of addition from the full adder FA32. The full adder FA45 receives the square root partial data q3, and the result of addition from the full adder FA33. The full adder FA46 receives the square root partial data q3, and the result of addition from the full adder FA34. The full adder FA47 receives the square root partial data q3, and the result of addition from the full adder FA35 to provide a carry output serving as the square root partial data q4.

A portion for generating the square root partial data q5 comprises a half adder HA51 and full adders FA51–FA59 which are connected in series so that carries are propagated in the designated order from the half adder HA51 to the full adder FA59. The half adder HA51 receives "1", and "0". The full adder FA51 receives "1", and "0". The full adder FA52 receives "0", and the result of addition from the half adder HA41. The full adder FA53 receives the exclusive-OR of the output data (q3^q4), and the result of addition from the full adder FA41. The full adder FA54 receives the exclusive-OR of the output data (q2^q4), and the result of addition from the full adder FA42. The full adder FA55 receives the exclusive-OR of the output data (q1^q4), and the result of addition from the full adder FA43. The full adder FA56 receives the square root partial data q4, and the result of addition from the full adder FA44. The full adder FA57 receives the square root partial data q4, and the result of addition from the full adder FA45. The full adder FA58 receives the square root partial data q4, and the result of addition from the full adder FA46. The full adder FA59 receives the square root partial data q4, and the result of addition from the full adder FA47 to provide a carry output serving as the square root partial data q5.

A portion for generating the square root partial data q6 comprises a half adder HA61 and full adders FA61–FA69, FA6A, and FA6B which are connected in series so that carries are propagated in the designated order from the half adder HA61 to the full adder FA6B. The half adder HA61 receives "1", and "0". The full adder FA61 receives "1", and "0". The full adder FA62 receives "0", and the result of addition from the half adder HA51. The full adder FA63 receives the exclusive-OR of the output data (q4^q5), and the result of addition from the full adder FA51. The full adder FA64 receives the exclusive-OR of the output data (q3^q5), and the result of addition from the full adder FA52. The full adder FA65 receives the exclusive-OR of the output data (q2^q5), and the result of addition from the full adder FA53. The full adder FA66 receives the exclusive-OR of the output data (q1^q5), and the result of addition from the full adder FA54. The full adder FA67 receives the square root partial data q5, and the result of addition from the full adder FA55. The full adder FA68 receives the square root partial data q5, and the result of addition from the full adder FA56. The full adder FA69 receives the square root partial data q5, and the result of addition from the full adder FA57. The full adder FA6A receives the square root partial data q5, and the result of addition from the full adder FA58. The full adder FA6B receives the square root partial data q5, and the result of addition from the full adder FA59 to provide a carry output serving as the square root partial data q6.

A portion for generating the square root partial data q7 comprises a half adder HA71 and full adders FA71–FA79 and FA7A–FA7D which are connected in series so that carries are propagated in the designated order from the half adder HA71 to the full adder FA7D. The half adder HA71 receives "1", and "0". The full adder FA71 receives "1", and "0". The full adder FA72 receives "0", and the result of addition from the half adder HA61. The full adder FA73 receives the exclusive-OR of the output data (q5^q6), and the result of addition from the full adder FA61. The full adder FA74 receives the exclusive-OR of the output data (q4^q6), and the result of addition from the full adder FA62. The full adder FA75 receives the exclusive-OR of the output data (q3^q6), and the result of addition from the full adder FA63. The full adder FA76 receives the exclusive-OR of the output data (q2^q6), and the result of addition from the full adder FA64. The full adder FA77 receives the exclusive-OR of the output data (q1^q6), and the result of addition from the full adder FA65. The full adder FA78 receives the square root partial data q6, and the result of addition from the full adder FA66. The full adder FA79 receives the square root partial data q6, and the result of addition from the full adder FA67. The full adder FA7A receives the square root partial data q6, and the result of addition from the full adder FA68. The full adder FA7B receives the square root partial data q6, and the result of addition from the full adder FA69. The full adder FA7C receives the square root partial data q6, and the result of addition from the full adder FA6A. The full adder FA7D receives the square root partial data q6, and the result of addition from the full adder FA6B to provide a carry output serving as the square root partial data q7.

A portion for generating the square root partial data q8 comprises a half adder HA81 and full adders FA81–FA89 and FA8A–FA8F which are connected in series so that carries are propagated in the designated order from the half adder HA81 to the full adder FA8F. The half adder HA81 receives "1", and "0". The full adder FA81 receives "1", and "0". The full adder FA82 receives "0", and the result of addition from the half adder HA71. The full adder FA83 receives the exclusive-OR of the output data (q6^q7), and the result of addition from the full adder FA71. The full adder FA84 receives the exclusive-OR of the output data (q5^q7), and the result of addition from the full adder FA72. The full adder FA85 receives the exclusive-OR of the output data (q4^q7), and the result of addition from the full adder FA73. The full adder FA86 receives the exclusive-OR of the output data (q3^q7), and the result of addition from the full adder FA74. The full adder FA87 receives the exclusive-OR of the output data (q2^q7), and the result of addition from the full adder FA75. The full adder FA88 receives the exclusive-OR of the output data (q1^q7), and the result of addition from the full adder FA76. The full adder FA89 receives the square root partial data q7, and the result of addition from the full adder FA77. The full adder FA8A receives the square root partial data q7, and the result of addition from the full adder FA78. The full adder FA8B receives the square root partial data q7, and the result of addition from the full adder FA79. The full adder FA8C receives the square root partial data q7, and the result of addition from the full adder FA7A. The full adder FA8D receives the square root partial data q7, and the result of addition from the full adder FA7B. The full adder FA8E receives the square root partial data q7, and the result of addition from the full adder FA7C. The full adder FA8F receives the square root partial data q7, and the result of addition from the full adder FA7D to provide a carry output serving as the square root partial data q8.

In this manner, the square root extraction circuit of the first preferred embodiment may be constructed using only the existing adders to allow the application of various high-speed adders as the full adders FA or half adders HA, facilitating the high-speed operation.

Figure 3:
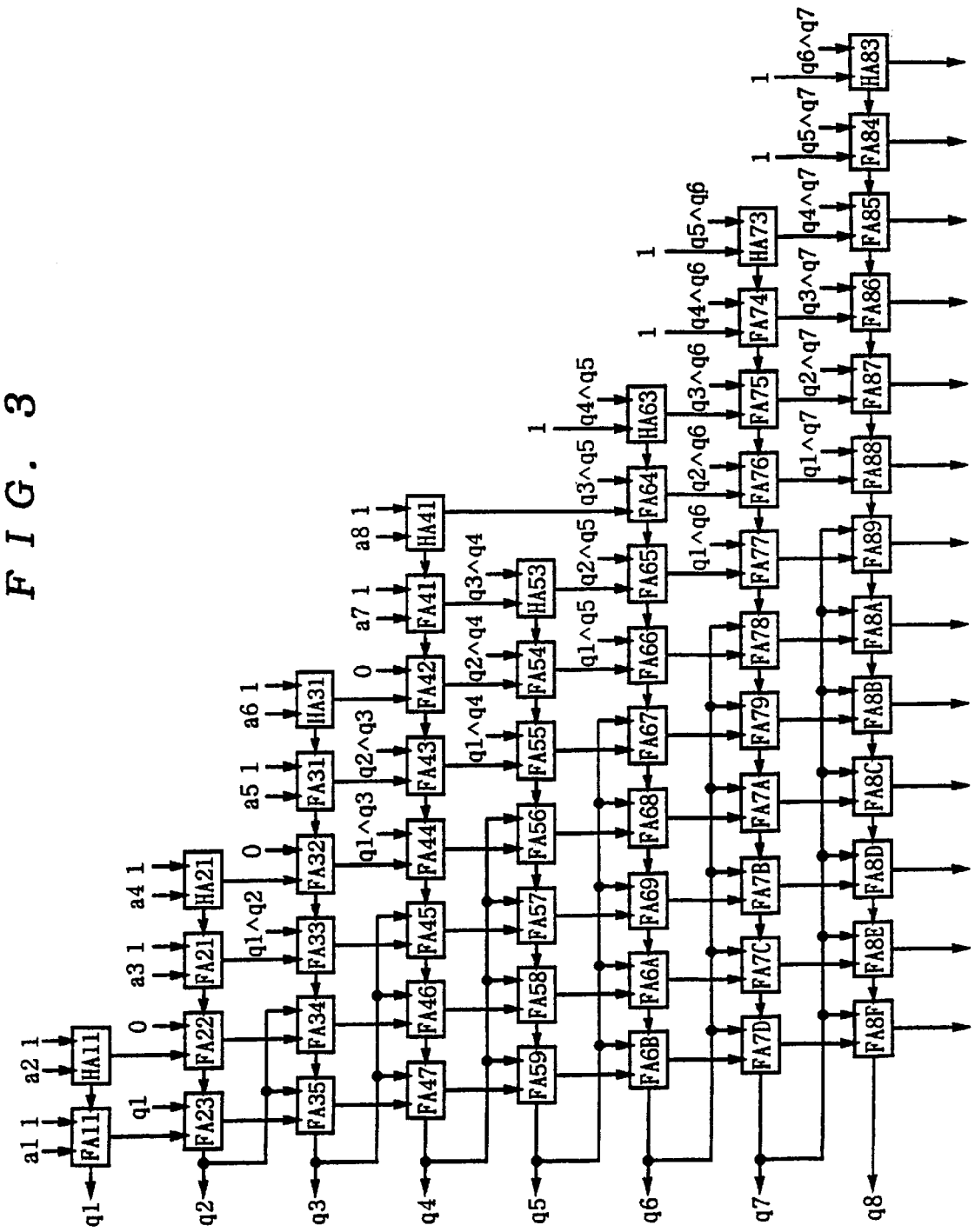
FIG. 3 is a block diagram showing another arrangement of the square root extraction circuit of the first preferred embodiment.

FIG. 3 is a block diagram showing another hardware arrangement of the square root extraction circuit according to the first preferred embodiment of the present invention wherein the adders which perform operations using "0" have been removed. Only the differences from the structure of FIG. 2 are described below.

In the portion for generating the square root partial data q5, the half adder HA51 and the full adders FA51 and FA52 have been removed; and a half adder HA53 is provided in place of the full adder FA53.

In the portion for generating the square root partial data q6, the half adder HA61 and the full adders FA61 and FA62 have been removed; a half adder HA63 is provided in place of the full adder FA63; the half adder HA63 receives "1" in place of the result of addition from the full adder FA51; and the input to the full adder FA64 is changed from the result of addition from the full adder FA52 to the result of addition from the half adder HA41.

In the portion for generating the square root partial data q7, the half adder HA71 and the full adders FA71 and FA72 have been removed; a half adder HA73 is provided in place of the full adder FA73; the half adder HA73 receives "1" in place of the result of addition from the full adder FA61; and the input to the full adder FA74 is changed from the result of addition from the full adder FA62 to "1".

In the portion for generating the square root partial data q8, the half adder HA81 and the full adders FA81 and FA82 have been removed; a half adder HA83 is provided in place of the full adder FA83; the half adder HA83 receives "1" in place of the result of addition from the full adder FA71; and the input to the full adder FA84 is changed from the result of addition from the full adder FA72 to "1".

The arrangement shown in FIG. 3 is intended to simplify less significant elements in the portions for generating the square root partial data q5 to q8. The removal of substantially three full adders FA in the portions for generating the square root partial data q5 to q8 accomplishes the reduction in the number of adders, the reduction in circuit area, and improvement in operation speed.

Second Preferred Embodiment

Figure 4:
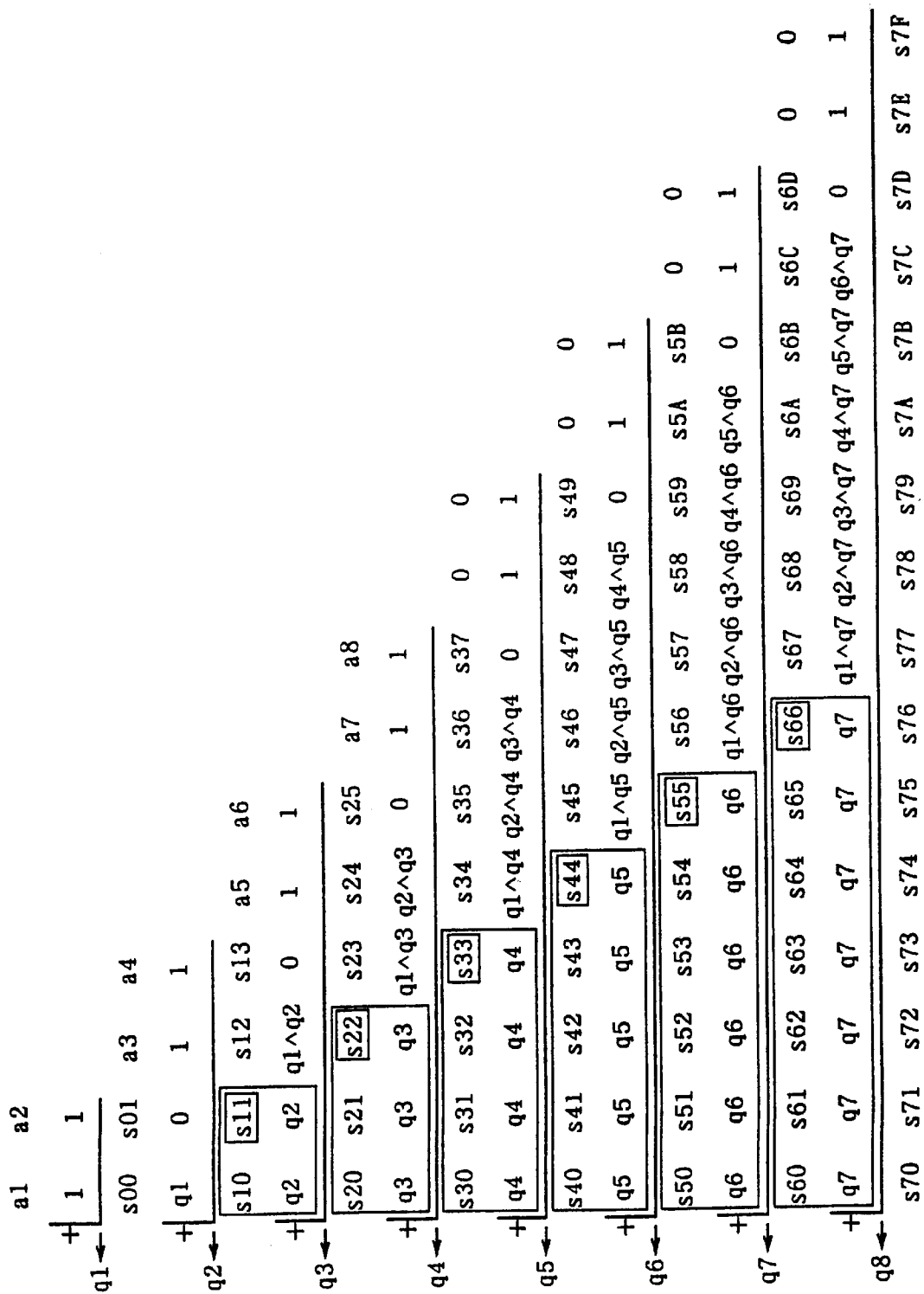
FIG. 4 illustrates a square root extraction algorithm used for the square root extraction circuit according to a second preferred embodiment of the present invention.

FIG. 4 illustrates a second square root extraction algorithm used for the square root extraction circuit according to a second preferred embodiment of the present invention. The algorithm of FIG. 4 is similar to that of FIG. 1 except the representation using rectangular blocks. The second square root extraction algorithm makes improvements to the first square root extraction algorithm to achieve a smaller circuit area and a higher operation speed.

Figure 5:
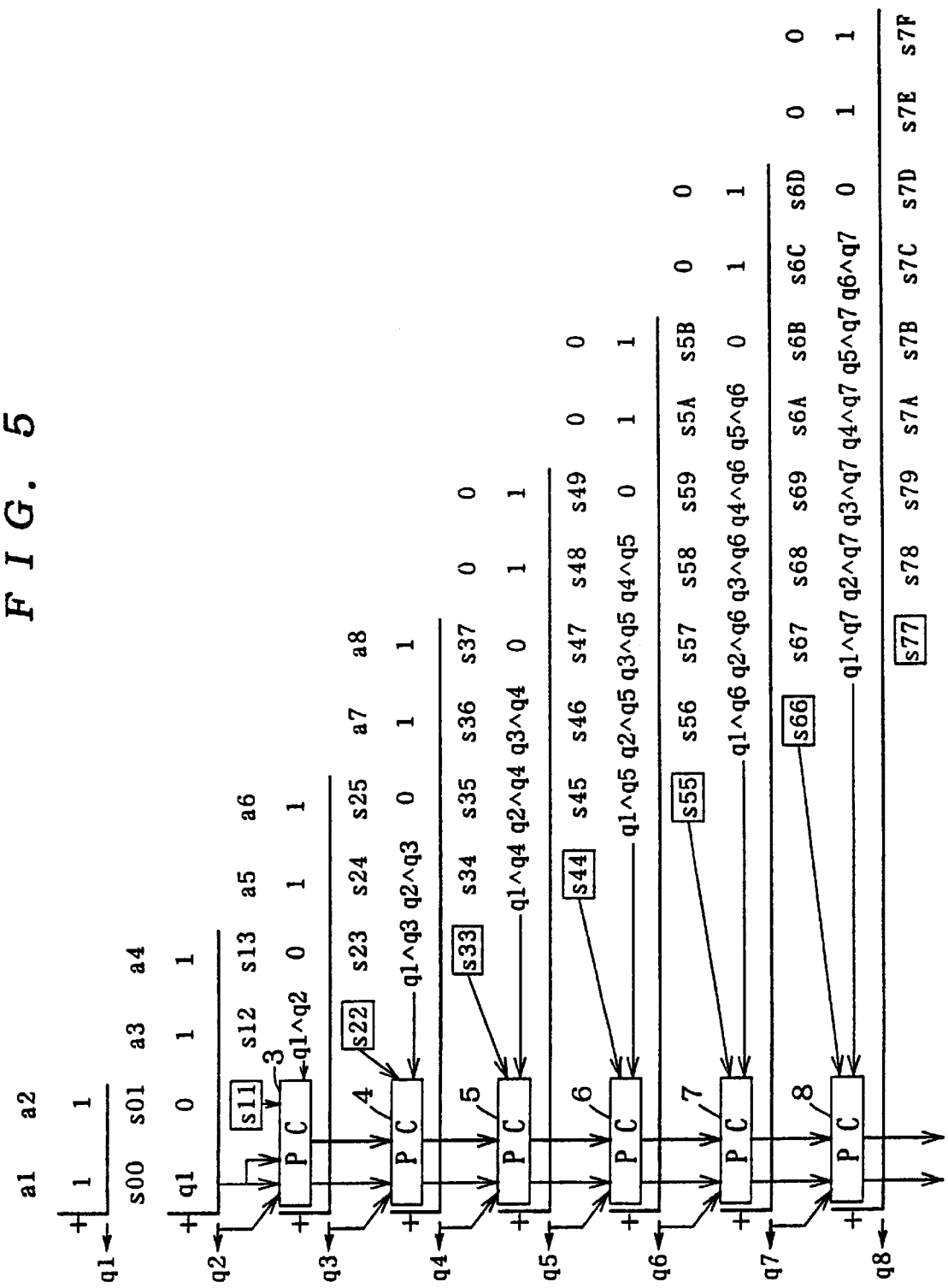
FIG. 5 schematically illustrates the arrangement of the square root extraction circuit of the second preferred embodiment.

Attention is focused on the sections enclosed in the rectangular blocks for improvements in the algorithm. The sections enclosed in the rectangular blocks (augends) are preceding digit based operation portions which use the square root partial data of their preceding digits such as the square root partial data q1 and q2. In the square root extraction operation, the square root partial data qk (k equals any one of 1 to 8) is the carry output from the MSB adder in each of the square root partial data generating portions (FA11, FA23, FA35, FA47, ..., FA8F), and the correct value of the addition output SUM from the MSB adder in each of the square root partial data generating portions is not required. That is, calculation of correct carries allows the correct square root extraction operation. Then, for the operations in the sections enclosed in the rectangular blocks, it is supposed that carry output prediction circuits (PC) 3 to 8 for carry outputs are provided in place of the adders for performing the operations enclosed in the rectangular blocks as illustrated in FIG. 5.

For example, the carry output prediction circuit 3 for predicting the square root partial data q3 is discussed below. The square root partial data q2 is an output from the preceding square root partial data generating portion. The reference characters s10 to s13 designate the results of addition from the adders in the preceding square root partial data generating portion (the portion for generating the square root partial data q2), with the result s10 indicating the MSB and the result s13 indicating the LSB. The reference characters a5 and a6 designate input data corresponding bits.

The carry output q3 which becomes "1" as a result of 2-bit addition (s10+q2), (s11+q2) (each 1 bit) is correctly predicted on the following conditions:

(2-1) q2=1; and Cin=1

(2-2) q2=0; (s10, s11)=(1, 1); and Cin=1

(2-3) q2=1; (s10, s11)=(1, 0) or (0, 1); and Cin=0 where Cin is a carry from (s12+(q1^q2)).

It should be noted that the value of the carry output q3 is immediately determined without an addition, depending upon whether or not q2, Cin, s10 and s11 satisfy the conditions (2-1) to (2-3).

Similar technique may be applied to the carry output prediction circuit 4 for predicting the carry output q4. Then, the carry output q4 which becomes "1" is determined on the following conditions:

(3-1) q3=1; and Cin=1

(3-2) q3=0; (s20, s21, s22)=(1, 1, 1); and Cin=1

(3-3) q3=1; (s20, s21, s22)=(1, 1, 0), (1, 0, 1), (0, 1, 1), (1, 0, 0) (0, 1, 0), or (0, 0, 1); and Cin=0 where Cin is a carry from (s23+(q1^q3)).

The judgments about the above described conditions (2-1) to (2-3) or (3-1) to (3-3) may be implemented by predetermined logic operations, and apparently require no adders.

The section enclosed in the rectangular blocks shown in FIG. 4 may be replaced with the carry output prediction circuit 3 or 4 for judging the logic conditions such as the above described conditions (2-1) to (2-3) or (3-1) to (3-3) without using the adders.

Each of the carry output prediction circuits executes no conventional additions, thereby providing no addition outputs to the carry output prediction circuit of the next square root partial data generating portion. Thus, condition flags (AHin, ALin) are used to indicate addition result information about the results of addition such as SUM((s20, s21), (s30, s31, s32)) since information about a carry from the MSB is important in the square root extraction operation.

The flag AHin for a digit of a given significance is "1" when all addition results for the digit of the next higher significance are "1", and is "0" when they are not. The flag ALin for a digit of a given significance is "1" when all addition results for the digit of the next higher significance are "0", and is "0" when they are not.

For example, the flag AHin for the square root partial data q3 is "1" when SUM(s10) for the digit of the next higher significance (the square root partial data q2) is "1", and is "0" when it is not. The flag ALin for the square root partial data q3 is "1" when SUM(s10) for the digit of the next higher significance (the square root partial data q2) is "0", and is "0" when it is not. Using the condition flags (AHin, ALin), the conditions (2-1) to (2-3) may be expressed as:

(2-1') q2=1; and Cin=1

(2-2') q2=0; AHin=1 {and ALin=0}; s11=1; and Cin=1

(2-3') q2=1; (ALin=0 or s11=1); and Cin=0

The contents enclosed in the curly brackets { } of the condition (2-2') may be omitted. The conditions for setting condition flags (AHout, ALout) which are outputted from the carry output prediction circuit 3 for the square root partial data q3 and used as the condition flags (AHin, ALin) of (s20, s21) for the square root partial data q4 are determined by:

AHout=Cin & {q2 & (AHin & ¯ALin & s11)+(¯q2 & (AHin & ¯ALin & ¯s11)}+¯Cin & {q2 & (ALin & ¯s11)+¯q2 & (AHin & ¯ALin & s11)}    (6)

and $$ALout = Cin \ \& \ \{q2 \ \& \ (ALin \ \& \ ^-s11) + (^-q2 \ \& \ (AHin \ \& \ ^-ALin \ \& \ s11)\} + ^-Cin \ \& \ \{q2 \ \& \ (ALin \ \& \ s11) + ^-q2 \ \& \ (ALin \ \& \ ^-s11)\} \quad (7)$$

The conditions (2-1') to (2-3') and Expressions (6) and (7) may be generalized as:

$$AHout = Cin \ \& \ \{Q \ \& \ (AHin \ \& \ ^-ALin \ \& \ SUM) + (^-Q \ \& \ (AHin \ \& \ ^-ALin \ \& \ SUM)\} + ^-Cin \ \& \ \{Q \ \& \ (ALin \ \& \ ^-SUM) + ^-Q \ \& \ (AHin \ \& \ ^-ALin \ \& \ SUM)\} \quad (8)$$

$$ALout = Cin \ \& \ \{Q \ \& \ (ALin \ \& \ SUM) + (^-Q \ \& \ (AHin \ \& \ ^-ALin \ \& \ SUM)\} + ^-Cin \ \& \ \{Q \ \& \ (ALin \ \& \ SUM) + ^-Q \ \& \ (ALin \ \& \ ^-SUM)\} \quad (9)$$

and $$Cout = Cin \ \& \ \{Q + ^-Q \ \& \ (AHin \ \& \ ^-ALin \ \& \ SUM)\} + ^-Cin \ \& \ Q \ \& \ ^-(ALin \ \& \ ^-SUM) \quad (10)$$

where Q is a square root extraction output (square root partial data) from the preceding square root partial data generating portion; SUM is the most significant bit calculated by an adder among the addition results from the preceding square root partial data generating portion; $^-$ represents a logic inversion; & represents an AND operation; and + represents an OR operation. Table 1 is a truth table showing the condition flags AHout, ALout, and the carry output Cout which are calculated from Expressions (8) to (10).

TABLE 1

| Cin | Q | AHin | ALin | SUM | AHout | ALout | Cout |
|---|---|---|---|---|---|---|---|
| 0 | 0 | 0 | 0 | 0 | 0 | 0 | 0 |
| 0 | 0 | 0 | 0 | 1 | 0 | 0 | 0 |
| 0 | 1 | 0 | 0 | 0 | 0 | 0 | 1 |
| 0 | 1 | 0 | 0 | 1 | 0 | 0 | 1 |
| 0 | 0 | 0 | 1 | 0 | 0 | 1 | 0 |
| 0 | 0 | 0 | 1 | 1 | 0 | 0 | 0 |
| 0 | 1 | 0 | 1 | 0 | 1 | 0 | 0 |
| 0 | 1 | 0 | 1 | 1 | 0 | 1 | 1 |
| 0 | 0 | 1 | 0 | 0 | 0 | 0 | 0 |
| 0 | 0 | 1 | 0 | 1 | 1 | 0 | 0 |
| 0 | 1 | 1 | 0 | 0 | 0 | 0 | 1 |
| 0 | 1 | 1 | 0 | 1 | 0 | 0 | 1 |
| 0 | 0 | 1 | 1 | 0 | 0 | 1 | 0 |
| 0 | 0 | 1 | 1 | 1 | 0 | 0 | 0 |
| 0 | 1 | 1 | 1 | 0 | 1 | 0 | 0 |
| 0 | 1 | 1 | 1 | 1 | 0 | 1 | 1 |
| 1 | 0 | 0 | 0 | 0 | 0 | 0 | 0 |
| 1 | 0 | 0 | 0 | 1 | 0 | 0 | 0 |
| 1 | 1 | 0 | 0 | 0 | 0 | 0 | 1 |
| 1 | 1 | 0 | 0 | 1 | 0 | 0 | 1 |
| 1 | 0 | 0 | 1 | 0 | 0 | 0 | 0 |
| 1 | 0 | 0 | 1 | 1 | 0 | 0 | 0 |
| 1 | 1 | 0 | 1 | 0 | 0 | 1 | 1 |
| 1 | 1 | 0 | 1 | 1 | 0 | 0 | 1 |
| 1 | 0 | 1 | 0 | 0 | 1 | 0 | 0 |
| 1 | 0 | 1 | 0 | 1 | 0 | 1 | 1 |
| 1 | 1 | 1 | 0 | 0 | 0 | 0 | 1 |
| 1 | 1 | 1 | 0 | 1 | 1 | 0 | 1 |
| 1 | 0 | 1 | 1 | 0 | 0 | 0 | 0 |
| 1 | 0 | 1 | 1 | 1 | 0 | 0 | 0 |
| 1 | 1 | 1 | 1 | 0 | 0 | 1 | 1 |
| 1 | 1 | 1 | 1 | 1 | 0 | 0 | 1 |

The use of the algorithm indicated by Expressions (8) to (10) is advantageous in that a fixed number of variables are contained in Expressions (8) to (10) although the number of adders to be replaced with the single carry output prediction circuit increases in descending order of significance of digits of the square root extraction outputs. In other words, the lower significance the digits of the square root extraction outputs have, the more omissible adders, to improve the operation speed while the size of the carry output prediction circuits 3 to 8 required therefor remains unchanged.

Figure 6:
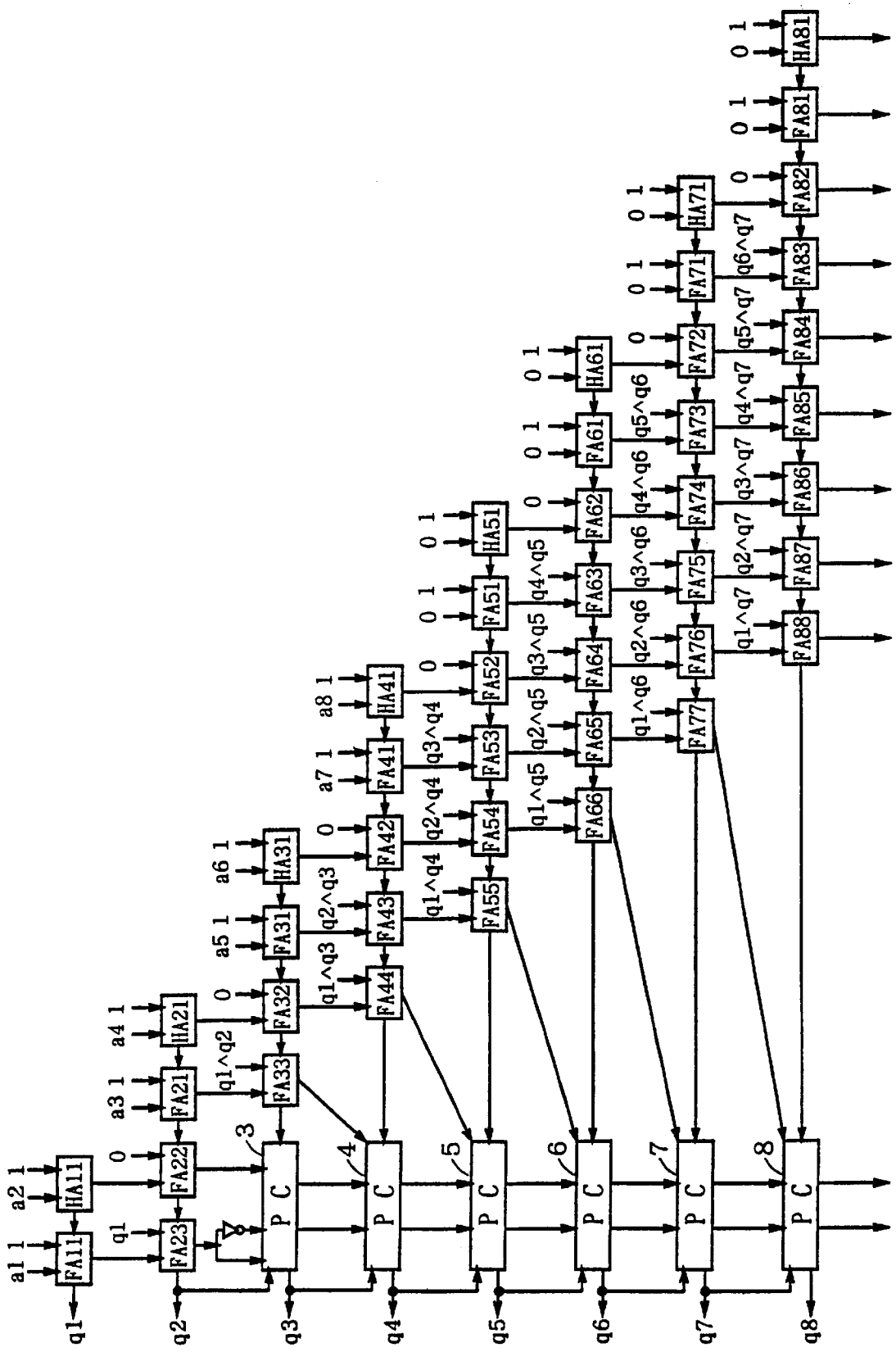
FIG. 6 is a block diagram of the square root extraction circuit of the second preferred embodiment.

FIG. 6 is a block diagram showing the hardware structure of the square root extraction circuit according to the second preferred embodiment of the present invention. The square root extraction circuit of FIG. 6 differs from that of the first preferred embodiment shown in FIG. 2 in that: the carry output prediction circuit 3 is provided in place of the full adders FA34 and FA35; the carry output prediction circuit 4 is provided in place of the full adders FA45–FA47; the carry output prediction circuit 5 is provided in place of the full adders FA56–FA59; the carry output prediction circuit 6 is provided in place of the full adders FA67–FA69, FA6A, and FA6B; the carry output prediction circuit 7 is provided in place of the full adders FA78, FA79, and FA7A–FA7D; and the carry output prediction circuit 8 is provided in place of the full adders FA89, and FA8A–FA8F.

Figure 7:
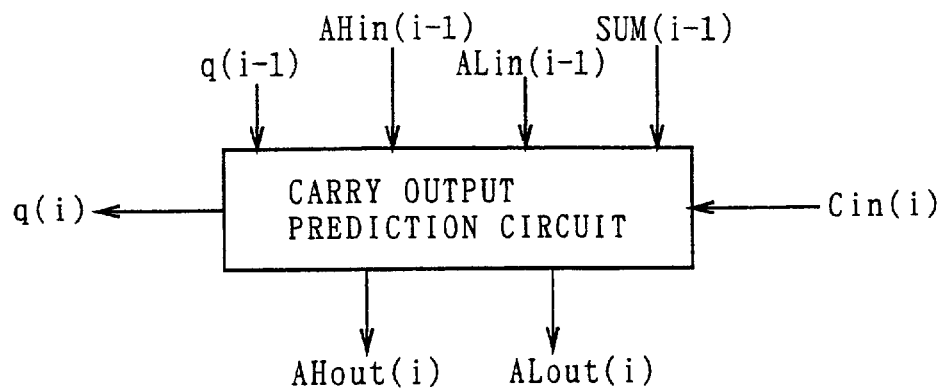
FIG. 7 illustrates an input and output arrangement of a carry output prediction circuit.

FIG. 7 is a block diagram showing an input and output arrangement of the carry output prediction circuit i (i equals any one of 3 to 8) according to the present invention. As shown in FIG. 7, the carry output prediction circuit i receives the condition flags AHin and ALin, the most significant addition result SUM, and the square root partial data q(i−1) from the preceding square root partial data generating portion, and also receives the carry input Cin to provide the condition flags AHout and ALout for the next square root partial data generating portion, and the square root partial data q(i). The condition flags AHout and ALout are used as the condition flags AHin and ALin for the carry output prediction circuit (i+1).

It should be noted that the carry output prediction circuit 3 receives the result of addition from the full adder FA23 as the condition flag AHin, the inverse of the result of addition from the full adder FA23 as the condition flag ALin, and the result of addition from the full adder FA22 as the most significant addition result SUM.

Figure 8:
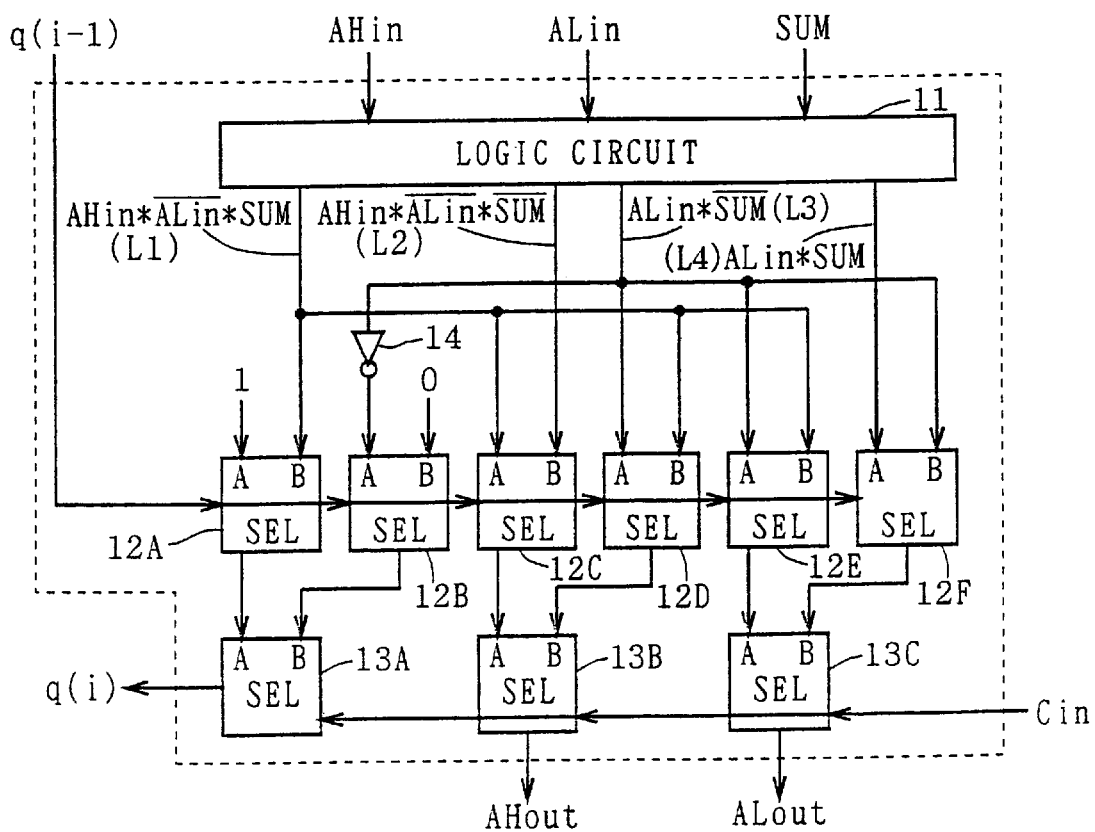
FIG. 8 is a block diagram showing the internal structure of the carry output prediction circuit of FIG. 7.

FIG. 8 is a block diagram showing the internal structure of the carry output prediction circuit. As shown in FIG. 8, a logic circuit 11 receives the condition flags AHin and ALin and the most significant addition result SUM from the preceding square root partial data generating portion to output four logic operation results L1 (AHin*$^-$ALin*SUM), L2 (AHin*$^-$ALin*$^-$SUM), L3 (ALin*$^-$SUM), and L4 (ALin*SUM) where * indicates an AND operation.

Each selection circuit 12A to 12F selectively outputs the logic operation result given at its A/B input in response to the square root partial data q(i−1) from the preceding square root partial data generating portion which is "1"/"0". The selection circuit 12A receives "1" at its A input, and the logic operation result L1 at its B input. The selection circuit 12B receives the logic operation result L3 inverted by an inverter 14 at its A input, and "0" at its B input. The selection circuit 12C receives the logic operation result L1 at its A input, and the logic operation result L2 at its B input. The selection circuit 12D receives the logic operation result L3 at its A input, and the logic operation result L1 at its B input. The selection circuit 12E receives the logic operation result 13 at its A input, and the logic operation result L1 at its B input. The selection circuit 12F receives the logic operation result L4 at its A input, and the logic operation result L3 at its B input.

Each selection circuit 13A to 13C selectively outputs an A/B input in response to the carry input Cin which is "1"/"0". The selection circuit 13A receives the output from the selection circuit 12A at its A input, and the output from the selection circuit 12B at its B input to output the square root partial data q(i). The selection circuit 13B receives the output from the selection circuit 12C at its A input, and the output from the selection circuit 12D at its B input to output the condition flag AHout. The selection circuit 13C receives the output from the selection circuit 12E at its A input, and the output from the selection circuit 12F at its B input to output the condition flag ALout.

The carry output prediction circuit i having the above described structure may execute the logic operations indicated by Expressions (8) to (10).

The carry input Cin to the carry output prediction circuit i (i equals any one of 3 to 8) which is the output signal from the full adder FA (ii) in the most significant position decreases the operation speed in the presence of a load capacitance applied thereto. To prevent the decrease in operation speed, the carry input Cin to the carry output prediction circuit i is generally buffered. No logic inversion during the buffering requires two inverters which cause a two-gate delay. Therefore, the carry input Cin having a negative logic is effective so that only the single inverter is used for buffering.

Figure 9:
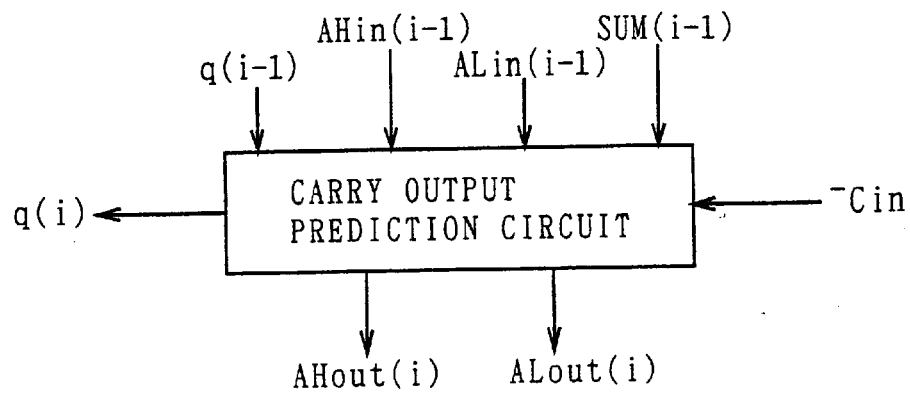
FIG. 9 illustrates another input and output arrangement of the carry output prediction circuit.
Figure 10:
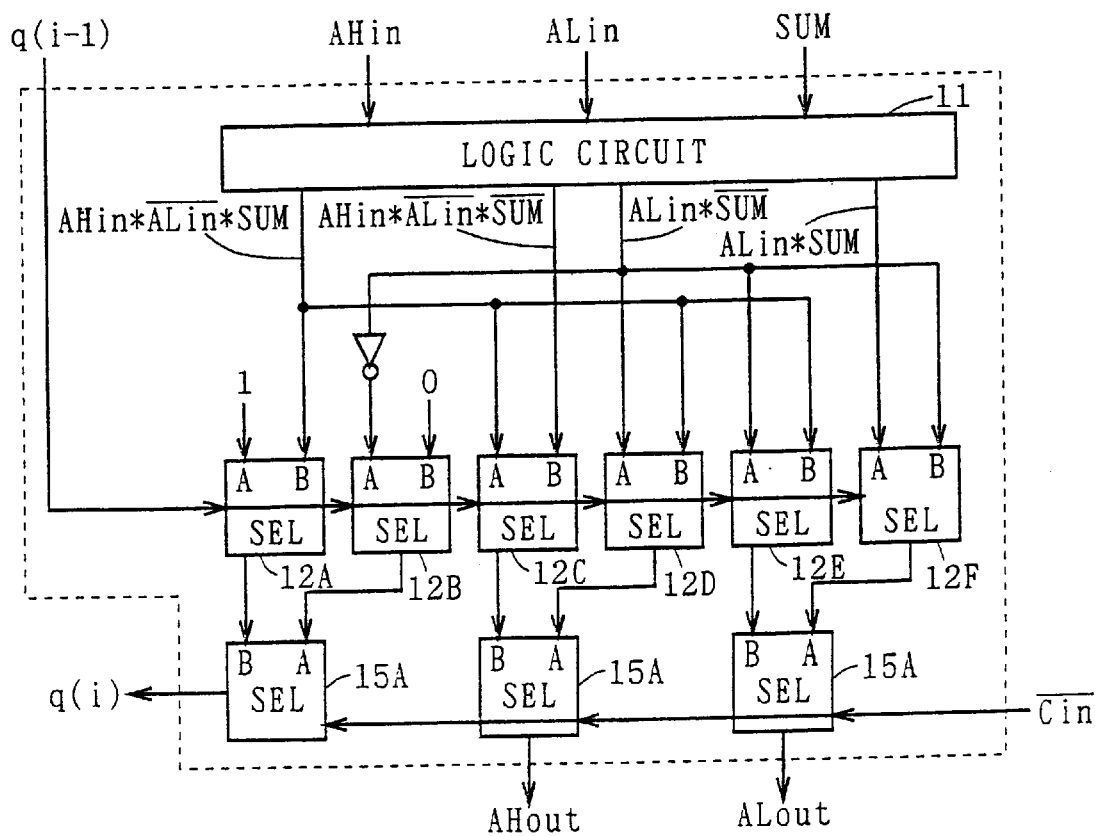
FIG. 10 is a block diagram showing the internal structure of the carry output prediction circuit of FIG. 9.

FIGS. 9 and 10 illustrate the carry output prediction circuit for the carry input Cin having the negative logic.

FIG. 9 is a block diagram showing another input and output arrangement of the carry output prediction circuit i (i equals any one of 3 to 8). As shown in FIG. 9, the carry output prediction circuit i receives the condition flags AHin and ALin, the most significant addition result SUM, and the square root partial data q(i-1) from the preceding square root partial data generating portion, and also receives the inverse $^-$Cin of the carry input Cin to provide the condition flags AHout and ALout for the next square root partial data generating portion, and the square root partial data q(i).

FIG. 10 is a block diagram showing the internal structure of the carry output prediction circuit of FIG. 9. The logic circuit 11 and the selection circuits 12A to 12F of FIG. 10 are similar in construction to those shown in FIG. 8.

The carry output prediction circuit of FIG. 10 comprises selection circuits 15A to 15C in place of the selection circuits 13A to 13C. Each of the selection circuits 15A to 15C selectively outputs an A/B input in response to the inverted carry input $^-$Cin which is "1"/"0" (the carry input Cin which is "0"/"1"). The selection circuit 15A receives the output from the selection circuit 12B at its A input, and the output from the selection circuit 12A at its B input to output the square root partial data q(i). The selection circuit 15B receives the output from the selection circuit 12D at its A input, and the output from the selection circuit 12C at its B input to output the condition flag AHout. The selection circuit 15C receives the output from the selection circuit 12F at its A input, and the output from the selection circuit 12E at its B input to output the condition flag ALout.

The carry output prediction circuit shown in FIG. 8 or 10 uses the square root partial data q(i-1) and carry input Cin which take longer time than any other input signals to determine the values thereof as selection control signals for the selection circuits 12A to 12F and the selection circuits 13A to 13C (15A to 15C), respectively. As a result, the carry output prediction circuit may minimize the delay time between the determination of the selection control signals and the determination of outputs of the square root partial data q(i) and the condition flags AHout and ALout.

Referring again to FIG. 6, the carry output prediction circuit 3 receives the addition result from the full adder FA23 as the input condition flag AHin, the inversion of the addition result from the full adder FA23 as the input condition flag ALin, the addition result from the full adder FA22 as the most significant addition result SUM, and the carry output from the full adder FA33 as the carry input Cin to output the square root partial data q3 and the output condition flags AHout and ALout.

The carry output prediction circuit j (j equals any one of 4 to 8) receives the output condition flag AHout from the carry output prediction circuit (j-1) as the input condition flag AHin, the output condition flag ALout therefrom as the input condition flag ALin, the addition result from the full adder FA(j-1)(j-1) as the most significant addition result SUM, and the carry output from the full adder FA(jj) as the carry input Cin to output the square root partial data qj and the output condition flags AHout and ALout.

In this manner, the square root extraction circuit of the second preferred embodiment may be constructed by replacing some of the full adders FA of the first preferred embodiment with the carry output prediction circuits. More specifically, the number of required adders NUM(FA, HA) (full adders FA or half adders HA) equals 45 when the number of input/output bits N equals 8 in the second preferred embodiment. Compared with the first preferred embodiment wherein the number of required adders NUM (FA, HA)=72, the second preferred embodiment achieves the reduction of 27 full adders FA to provide a more simplified circuit arrangement than the first preferred embodiment.

The logic operations by the carry output prediction circuits require no carry propagation to provide a higher operation speed than those of the first preferred embodiment. In the portion for generating the square root partial data q8, for example, the second preferred embodiment requires the carry propagation through nine adders HA81 and FA81–FA88 and one carry output prediction circuit 8 whereas the first preferred embodiment requires the carry propagation through 17 adders HA81 and FA81–FA8F. Consequently, the second preferred embodiment improves the operation speed over the first preferred embodiment.

Floating-point operations (single-precision/double-precision) and a multi-bit fixed-point data format are used for graphics processing and various numerical operation applications which require a high operation accuracy. For example, in the IEEE754 single-precision floating-point data format, mantissa data to which the above described algorithm is applied is 24 bits in length. In this case, 23 adders which are approximately half of 48 adders for determining the least significant square root partial data q24 may be replaced with a single carry output prediction circuit. It is apparent from this fact that the second preferred embodiment greatly reduces the circuit size and greatly improves the operation speed of the square root extraction circuit.

When the square root partial data q8 corresponds to the least significant bit (or a rounding bit, if provided), the square root partial data q8 have only to be calculated, and the condition flags AHout and ALout need not be correctly determined. Thus, the logic circuit 11 should output only the logic operation results L1 (AHin*$^-$ALin*SUM) and L3 (ALin*$^-$SUM), and the selection circuits 12C to 12F and the selection circuits 13B and 13C may be dispensed with.

The carry output prediction circuit for outputting the least significant bit may be of a simplified internal construction in this fashion. This achieves further reduction in circuit size and a higher operation speed.

In the arrangement shown in FIG. 5, the carry output prediction circuits are employed in the portions for generating the square root partial data q3 to the least significant square root partial data (i.e., the square root partial data q3 generating portion is the highest-order square root partial data generating portion that includes the carry output prediction circuit). However, a designer may freely select the highest-order square root partial data qj (2≦j≦8) generating portion that includes the carry output prediction circuit among the portions for generating the square root partial data q1 to q8.

This selection should be determined based on the relative relationship between the operation speed and circuit size of the carry output prediction circuits and the operation speed and circuit size of the full adders FA to be replaced with the carry output prediction circuits. The square root extraction circuit having an optimum circuit size and operation speed is provided by optimum selection of the adders to be replaced with the carry output prediction circuits.

Third Preferred Embodiment

It will be understood from FIG. 5 that the addition of the least significant 3-bit addend (s37, 0, 0) and the least significant 3-bit augend (0, 1, 1) in the portion for generating the square root partial data q5 constantly results in an adder output (s37, 1, 1) which is implemented without adders. The same is true for the least significant three bits in the portions for generating the square root partial data q6 to q8.

Figure 11:
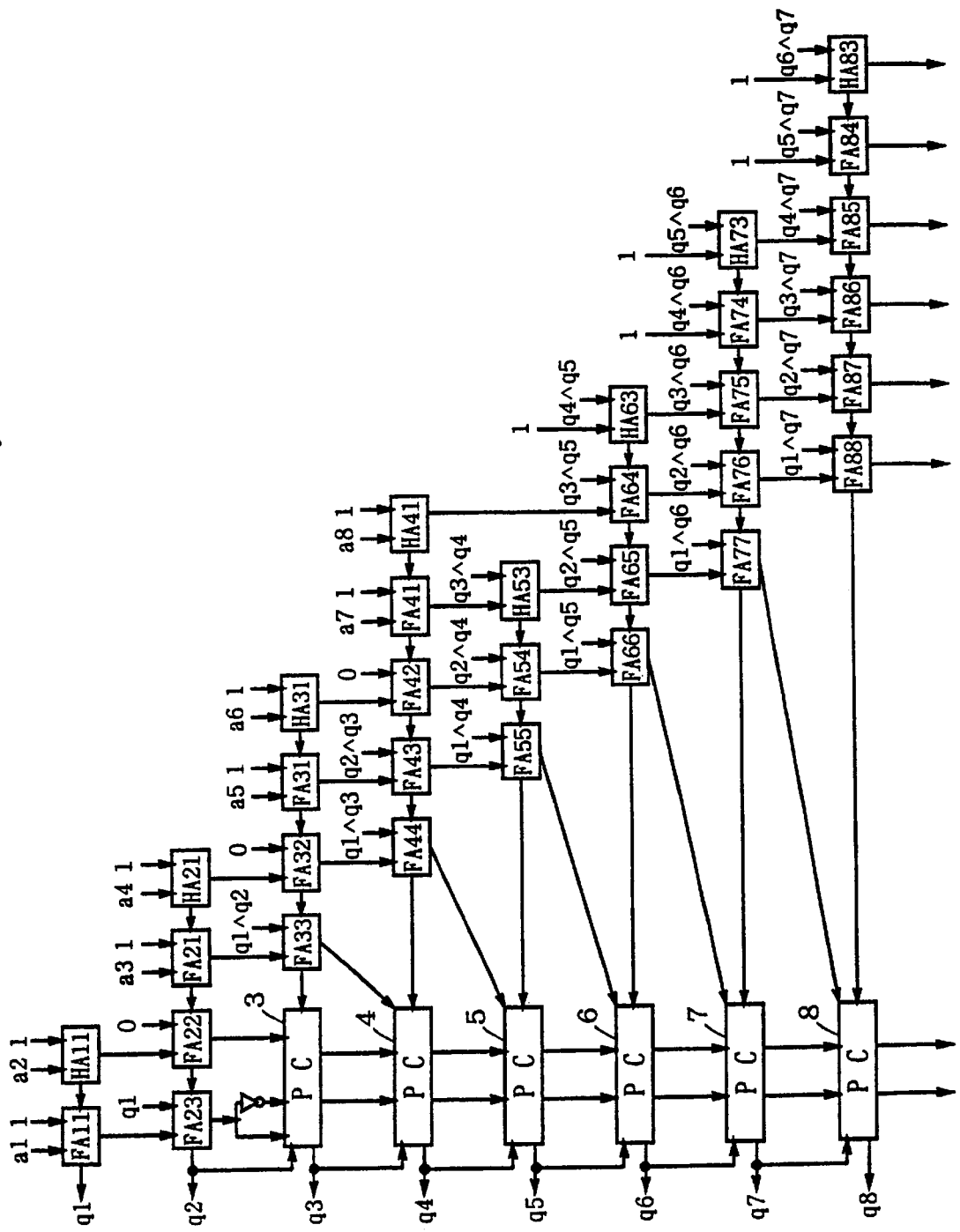
FIG. 11 is a block diagram of the square root extraction circuit according to a third preferred embodiment of the present invention.

FIG. 11 is a block diagram showing the hardware structure of the square root extraction circuit according to ai third preferred embodiment of the present invention. Only the differences from the structure of the second preferred embodiment shown in FIG. 6 are described below.

In the portion for generating the square root partial data q5, the half adder HA51, and the full adders FA51 and FA52 have been removed; and the half adder HA53 is provided in place of the full adder FA53.

In the portion for generating the square root partial data q6, the half adder HA61, and the full adders FA61 and FA62 have been removed; the half adder HA63 is provided in place of the full adder FA63; the half adder HA63 receives "1" in place of the result of addition from the full adder FA51; and the full adder FA64 receives the result of addition from the half adder HA41 in place of the result of addition from the full adder FA52.

In the portion for generating the square root partial data q7, the half adder HA71, and the full adders FA71 and FA72 have been removed; the half adder HA73 is provided in place of the full adder FA73; the half adder HA73 receives "1" in place of the result of addition from the full adder FA61; and the full adder FA74 receives "1" in place of the result of addition from the full adder FA62.

In the portion for generating the square root partial data q8, the half adder HA81, and the full adders FA81 and FA82 have been removed; the half adder HA83 is provided in place of the full adder FA83; the half adder HA83 receives "1" in place of the result of addition from the full adder FA71; and the full adder FA84 receives "1" in place of the result of addition from the full adder FA72.

The third preferred embodiment is intended to simplify less significant elements in the portions for generating the square root partial data q5 to q8. The removal of substantially three full adders FA in the portions for generating the square root partial data q5 to q8 accomplishes the reduction in the number of adders, the reduction in circuit area, and improvement in operation speed.

Fourth Preferred Embodimnent

To provide an N-bit output, a square root extraction output of greater than N bits (i.e., N bits and at least one additional bit) must be determined to round the Nth bit in accordance with the value of the additional bit(s). It is obvious that such additional bit processing requires more adders because of square root extraction operation characteristics. The second square root extraction algorithm described in the second preferred embodiment is very effective also in this case for reduction in circuit size and improvement in operation speed, and performs additional bit operations using a very small number of circuits, thereby adapted for improvement in operation accuracy.

Figure 12:
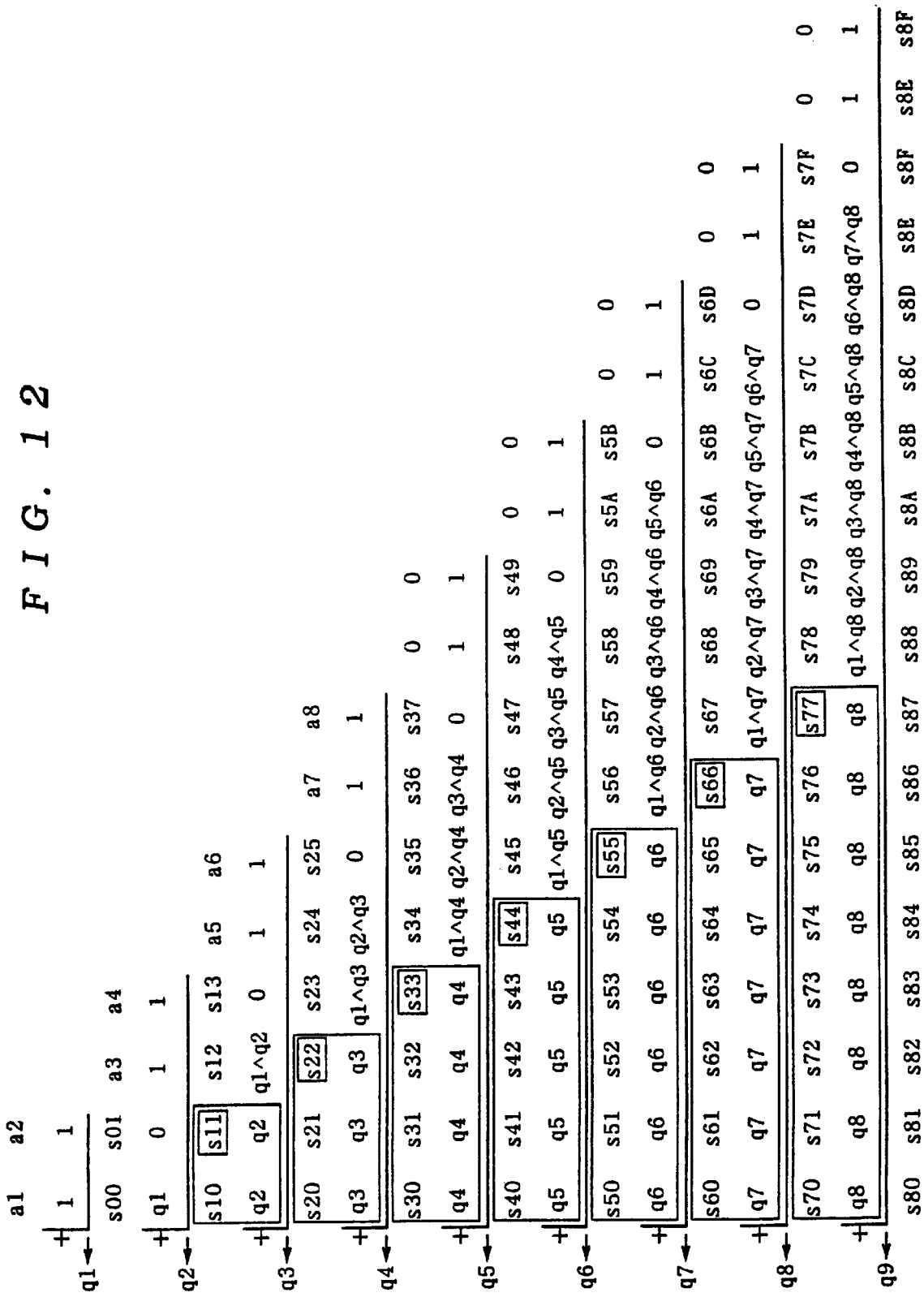
FIG. 12 illustrates a square root extraction algorithm used for the square root extraction circuit according to a fourth preferred embodiment of the present invention.
Figure 13:
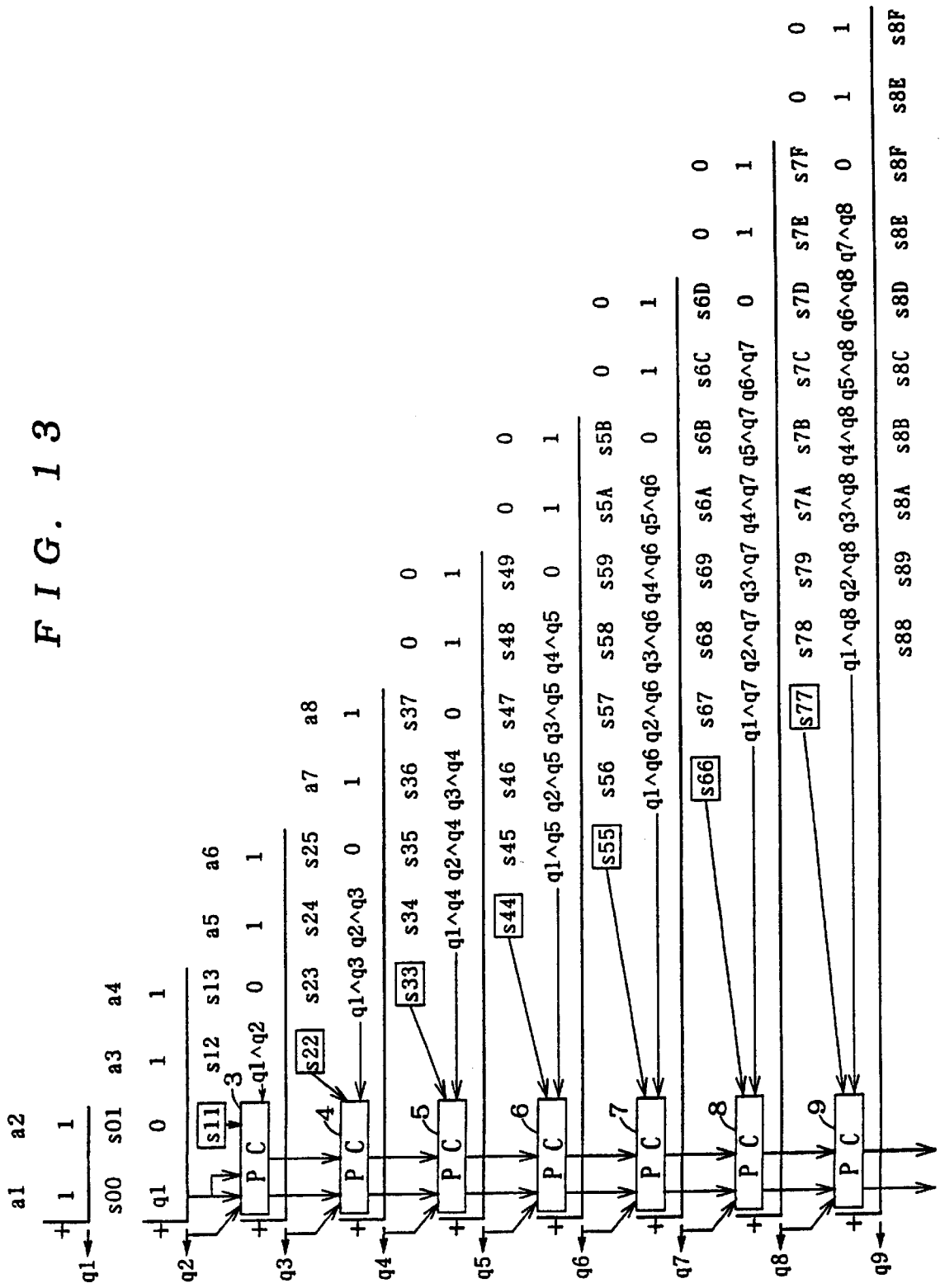
FIG. 13 schematically illustrates the arrangement of the square root extraction circuit of the fourth preferred embodiment.

FIG. 12 illustrates a square root extraction algorithm where the number of output bits N=8 and the number of additional bits equals 1. FIG. 13 schematically illustrates the square root extraction circuit wherein the carry output prediction circuits are employed in the portions for generating the square root partial data q3 to q9. As illustrated in FIGS. 12 and 13, a carry output prediction circuit 9 for square root partial data q9 for rounding may be used in place of eight full adders FA, accordingly achieving the reduction in circuit size and improvement in operation speed.

Figure 14:
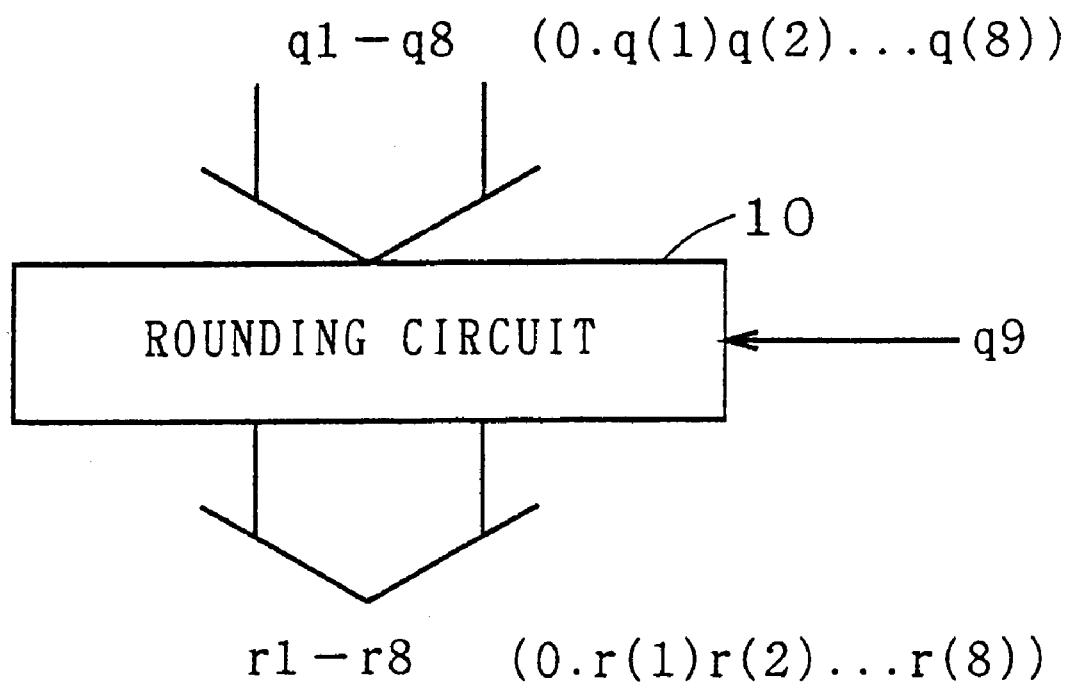
FIG. 14 illustrates an input and output arrangement of a rounding circuit of the fourth preferred embodiment.

FIG. 14 illustrates inputs to and outputs from a rounding circuit 10 according to a fourth preferred embodiment of the present invention. Upon receipt of the square root data q1 to q8 and the rounding square root partial data q9, the rounding circuit 10 rounds the square root data q1 to q8 (0.q(1) q(2) q(3) ... q(8)) based on the value of the rounding square root partial data q9 to output rounded square root data r1 to r8 (0.r(1) r(2) r(3) ... r(8)).

The carry output prediction circuit 9 for the square root partial data q9 need not determine the condition flags AHout and ALout which have been described in association with the second square root extraction algorithm since the square root partial data q9 corresponds to the last bit. Thus, the carry output prediction circuit 9 which is capable of calculating only the carry output Cout determined by Expression (10) for the second square root extraction algorithm should be used in the portion for generating the last bit (the square root partial data q9 in this preferred embodiment). The fourth preferred embodiment further reduces the circuit size and an additional capacitance of the input signals to the carry output prediction circuits, allowing a higher speed operation.

Like the third preferred embodiment, the fourth preferred embodiment allows the removal of the circuits for providing the least significant three bits in each of the portions for generating the square root partial data q5 to q9. This further reduces the number of adders and the circuit area, and further improves the operation speed.

Fifth Preferred Embodiment

Figure 15:
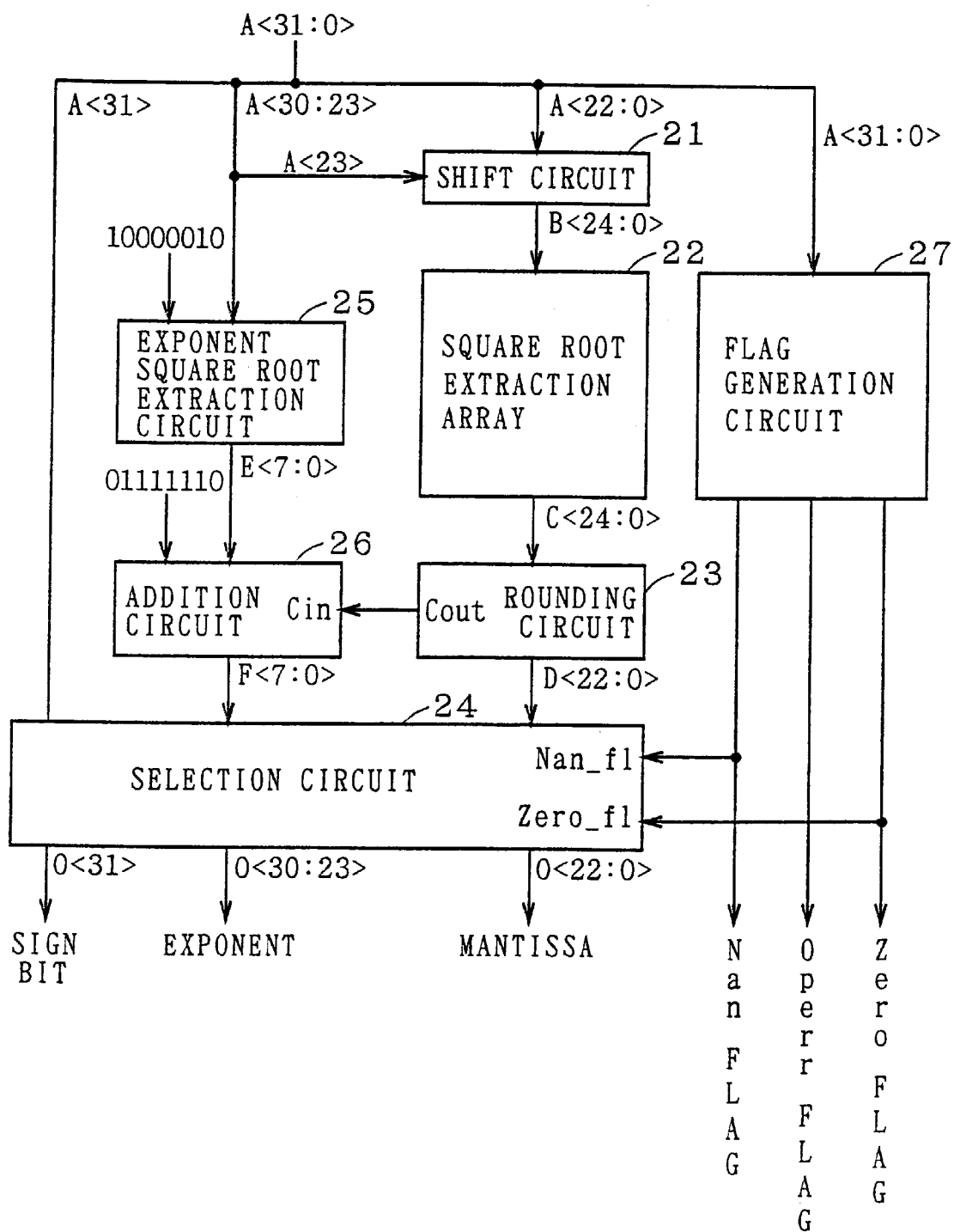
FIG. 15 is a block diagram of a floating-point square root extraction device according to a fifth preferred embodiment of the present invention.

FIG. 15 is a block diagram of a floating-point square root extraction device according to a fifth preferred embodiment of the present invention. In FIG. 15, the reference character A<31:0> designates input data wherein A<31> represents the most significant bit serving as a sign bit; A<30:23> represents an exponent; and A<22:0> represents a mantissa. The representation used herein conforms to the IEEE754 single-precision floating-point data format.

As depicted in FIG. 15, the floating-point square root extraction device of the fifth preferred embodiment comprises a shift circuit 21, a square root extraction array 22, rounding, circuit 23, a selection circuit 24, an exponent square root extraction circuit 25, an addition circuit 26, and a flag generation circuit 27. The reference character B<24:0> designates an output from the shit circuit 21; C<24:0> designates an output from the square root extraction array 22; D<22:0> designates an output from the rounding circuit 23; E<7:0> designates an output from the exponent square root extraction circuit 25; F<7:0> designates an output from the addition circuit 26; O<31> represents a sign bit outputted from the floating-point square root extraction device; O<30:23> represents an exponent outputted therefrom; and O<22:0> represents a mantissa outputted therefrom. The representation of the output O<31:0> from the device conforms to the IEEE754 data format.

The flag generation circuit 27 in the fifth preferred embodiment generates operation flags: an Nan flag (Not a Number flag (reset in an uncalculable state)), an Operr flag (operand error flag), and a Zero flag (reset when the result of operation is "0"). Other operation flags may be generated by modification of the flag generation circuit 27.

The sign bit A<31> indicates a plus sign when it is "0", and indicates a minus sign when it is "1". For the square root extraction operation of a negative number, the Operr flag is set, and the selection circuit 24 sets the sign bit O<31> to "1". The selection circuit 24 sets the sign bit O<31> to "0" in the fifth preferred embodiment when A is an unnormalized number. The selection circuit 24 sets the sign bit O<31> to "1" in the fifth preferred embodiment when the Nan flag is set (the input data is uncalculable).

When the exponent A<30:23> is an even number, the square root of the exponent is extracted merely by multiplying the exponent by ½. In the IEEE754 standard, a 23-bit fraction part is indicated as the mantissa, and the presence of an integer part "1" is implied (in the case of a normalized number). That is, it is premised that the mantissa is always expressed as {1.????????}.

The fifth preferred embodiment shall treat only normalized numbers for purposes of simplification since it is sufficient to treat the normalized numbers in an application which does not give much importance to operation errors, such as graphics application; for treatment of unnormalized numbers, a circuit arrangement is employed such that the unnormalized numbers are subjected to approximation to zero data and the results of operation are forced to be zero. An operation performed on unnormalized numbers results in unnormalized numbers. Thus, the fifth preferred embodiment forces all output data including the mantissa, exponent, and sign bit to be "0" when unnormalized numbers are inputted. The operation of the unnormalized numbers differs from that of the normalized numbers in that the exponent is not processed (the exponent is fixed to zero in the case of the unnormalized numbers). The operation of the mantissa of the unnormalized numbers is identical with that of the normalized numbers. Therefore, the concept of the fifth preferred embodiment may be applied to the basic structure/concept for the use of the unnormalized numbers.

Procedure of the processing performed on the exponent is as follows:

(1) An offset is subtracted. To shift the implied "1" to the fraction part, the offset is calculated: (127−1)=126. Then, the offset processing is performed: {A−126}.

(2) For ease of the extraction of the square root of the exponent, "1" is added to the exponent which is an odd number to provide an even number. That is, if A<23> is "1" (odd number), "1" is added to A<30:23>: {A−126+1}.

(3) The square root of the exponent is extracted. {{(A+1)−126}/2} if A<23> is "1", or {{A−126}/2} if A<23> is "0".

Figure 16:
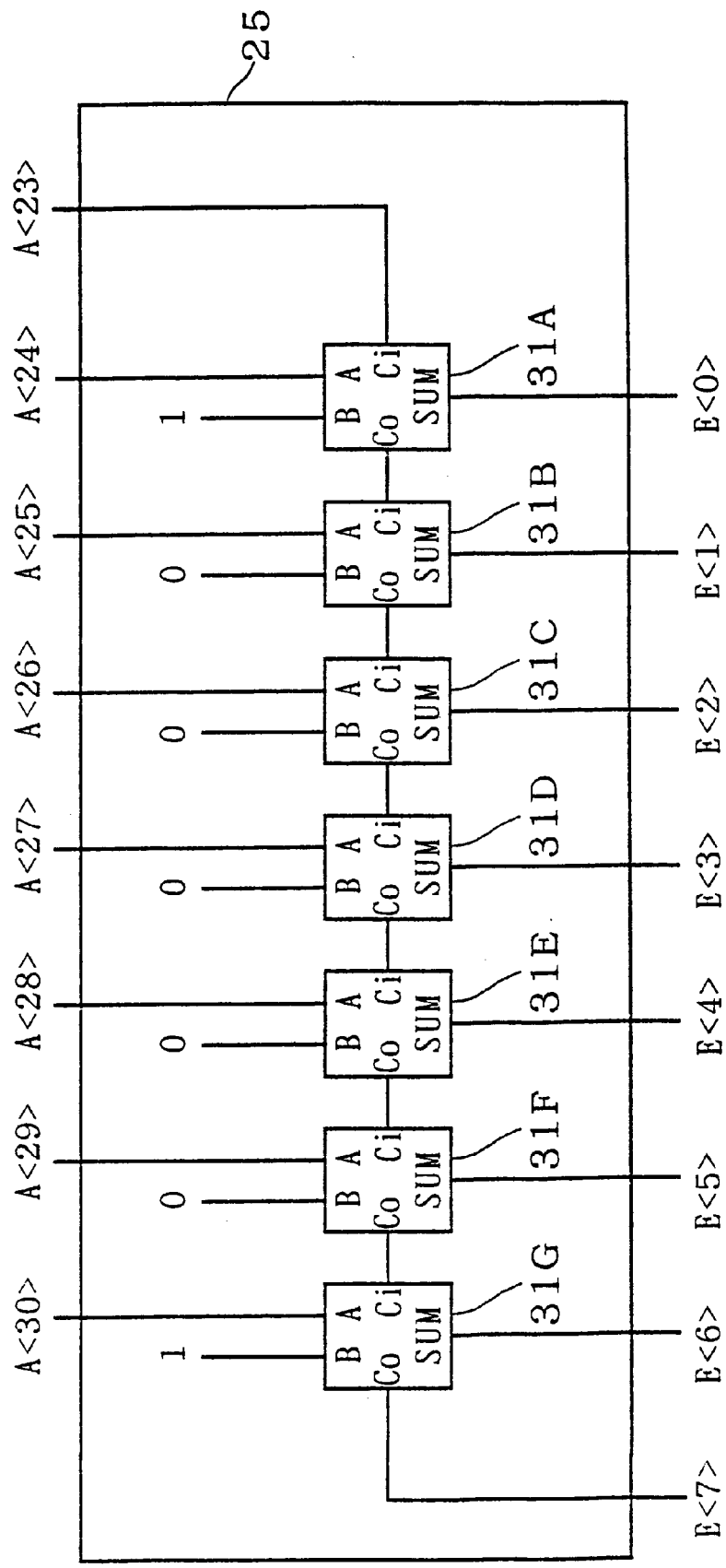
FIG. 16 is a block diagram showing the internal structure of an exponent square root extraction circuit shown in FIG. 15.

The exponent square root extraction circuit 25 according to the fifth preferred embodiment is capable of simultaneously performing the processings (1) to (3). FIG. 16 illustrates a circuit arrangement of the exponent square root extraction circuit 25. As shown in FIG. 16, the exponent square root extraction circuit 25 comprises full adders 31A to 31G corresponding to 7 bits. The full adders 31A to 31G are connected in series so that carries are propagated in the designated order from the full adder 31A to the full adder 31G. The full adder 31A receives the input A<24> at its A input, "1" at its B input, A<23> at its carry input Ci. The full adders 31B to 31G receive A<25> to A<30> at their A inputs, and "0", "0", "0", "0", "0", "1" at their B inputs, respectively. The full adders 31A to 31G provide addition results SUM serving as E<0> to E<6>, respectively. The full adder 31G provides a carry output Co serving as E<7>.

The B outputs are associated with the processing (2). Dividing the addition result by 2 in the processing (3) is implemented by determining E<0> to E<7> (corresponding to a 1-bit right shift). Then, the LSB (the result of addition of A<23> and "0") is not required and is hence truncated. Noting that only the carry output of the addition of the LSB (A<23>+0+1) is significant in the processings (1) and (2), the exponent square root extraction circuit 25 is constructed so that A<23> is directly applied to the carry input Ci of the full adder 31A. That is, a full adder for performing the addition of the LSB (A<23>+0+1) is omitted lay utilizing such property that the carry input Cin of the full adder 31A is "1" when A<23>=1.

The above described arrangement may implement the processings (1) to (3) using the adders corresponding to 7 bits, permitting the reduction in circuit size and the improvement in processing speed.

The addition circuit 26 establishes a connection so as to receive the carry output Cout from the rounding circuit 23 as a carry input to an adder for the LSB and to add E<7:0> and {01111110}₂ together, thereby simultaneously incrementing the exponent for normalization and performing the offset processing (+126) in accordance with the result of mantissa rounding process.

It is needless to say that the exponent square root extraction circuit 25 and the addition circuit 26 may be comprised of CLA (Carry Lookahead Adder) or CSA (Carry Select Adder) type high-speed adders to increase the processing speed. In these cases, the effects of the exponent square root extraction circuit 25 and the addition circuit 26 described above are apparently provided.

Figure 17:
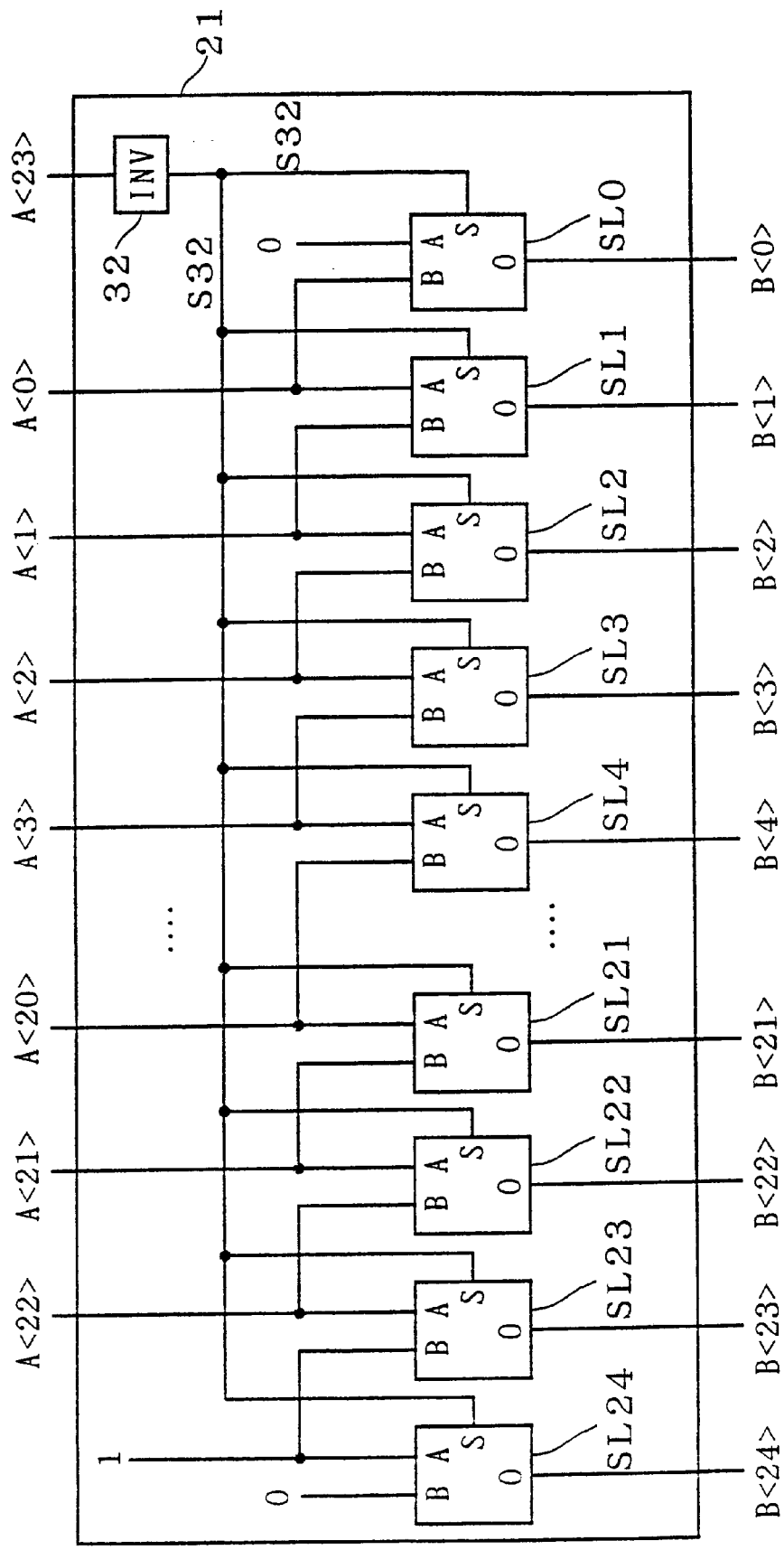
FIG. 17 is a block diagram showing the internal structure of a shift circuit shown in FIG. 15.

The mantissa A<22:0> is applied to the shift circuit 21 shown in FIG. 17 which comprises an inverter 32 and 25 selection circuits SL0 to SL24. The inverter 32 inverts A<23> to commonly apply a control signal S32 to the selection inputs S of the selection circuits SL0 to SL24. The selection circuit SLi (i=0 to 24) outputs B<i> which is the signal given at its A input when the control signal S32 is "1" and which is the signal given at its B input when the control signal S32 is "0".

The selection circuit SL0 receives "0" at its A input, and A<0> at its B input. The selection circuit SLj (j=1 to 22) receives A<j−1> at its A input, and A<i> at its B input. The selection circuit SL23 receives A<22> at its A input, and "1" at its B input. The selection circuit SL24 receives "1" at its A input, and "0" at its B input.

The shift circuit 21 having the above described structure is capable of shifting the implied "1" to the first decimal place, and also performing a mantissa 1-bit right shift when the exponent is incremented so that it becomes an even number (when the control signal S32 is "0"). The output B<24:0> from the shift circuit 21 equals {0, 1, A<22:0>} when A<23> is "1" since the exponent is an odd number, and equals {1, A<22:0>, 0} when A<23> is "0" since the exponent is an even number.

The square root extraction array 22 is equivalent to the square root extraction circuit of the first to fourth preferred embodiments, and is the hardware for performing the square root extraction operation upon B<24:0> outputted from the shift circuit 21. The square root extraction array 22 outputs C<24:0> where C<0> represents a digit (rounding bit) of the next lower significance than the LSB.

While employing the single bit C<0> for rounding, the fifth preferred embodiment may support the IEEE754- specified Nearest-even rounding (rounding to the nearest even number) including less significant bits. To determine the less significant bits, it is more advantageous to use the second square root extraction algorithm (second to fourth preferred embodiments) which minimizes the increasing number of adders because of the characteristics of the square root extraction operation which requires more adders in descending order of significance of bits. When C<0>=1, C<24:1>+1 is calculated to output D<24:1>. When C<0>=0, C<24:1> is outputted as D<24:1>.

When the result of addition for rounding in the rounding circuit 23 is Cout=1, that is, when the digit of the next higher significance than the MSB of the mantissa is "1" as a result of the calculation: C<24:1>+1, then the mantissa is shifted one place to the right for normalization and "1" is added to the exponent. This addition of the exponent is executed by the addition circuit 26.

In the fifth preferred embodiment, the flag generation circuit 27 determines the operation flags (e.g., Nan, Operr, and Zero flags) independently of the above described mantissa/exponent operation. When the Nan and Operr flags are set, the final output O<31:0> is set to Nan (all bits=1) by the selection circuit 24.

Further, the Zero flag is set when the input A<30:0> is ALL0 (all zeros) or an unnormalized number. Then, the selection circuit 24 outputs "0". Since the operation flags are determined for a shorter period of time than the square root extraction operation results, data are selected using the flags without the actual calculations when the input data is "0".

As above described, the floating-point square root extraction device according to the fifth preferred embodiment employs the square root extraction array 22 equivalent to the square root extraction circuit of the first to fourth preferred embodiments which implements the first or second square root extraction algorithm, thereby executing the floating-point square root extraction operation while achieving the circuit size reduction and the higher operation speed.

Sixth Preferred Embodiment

Figure 18:
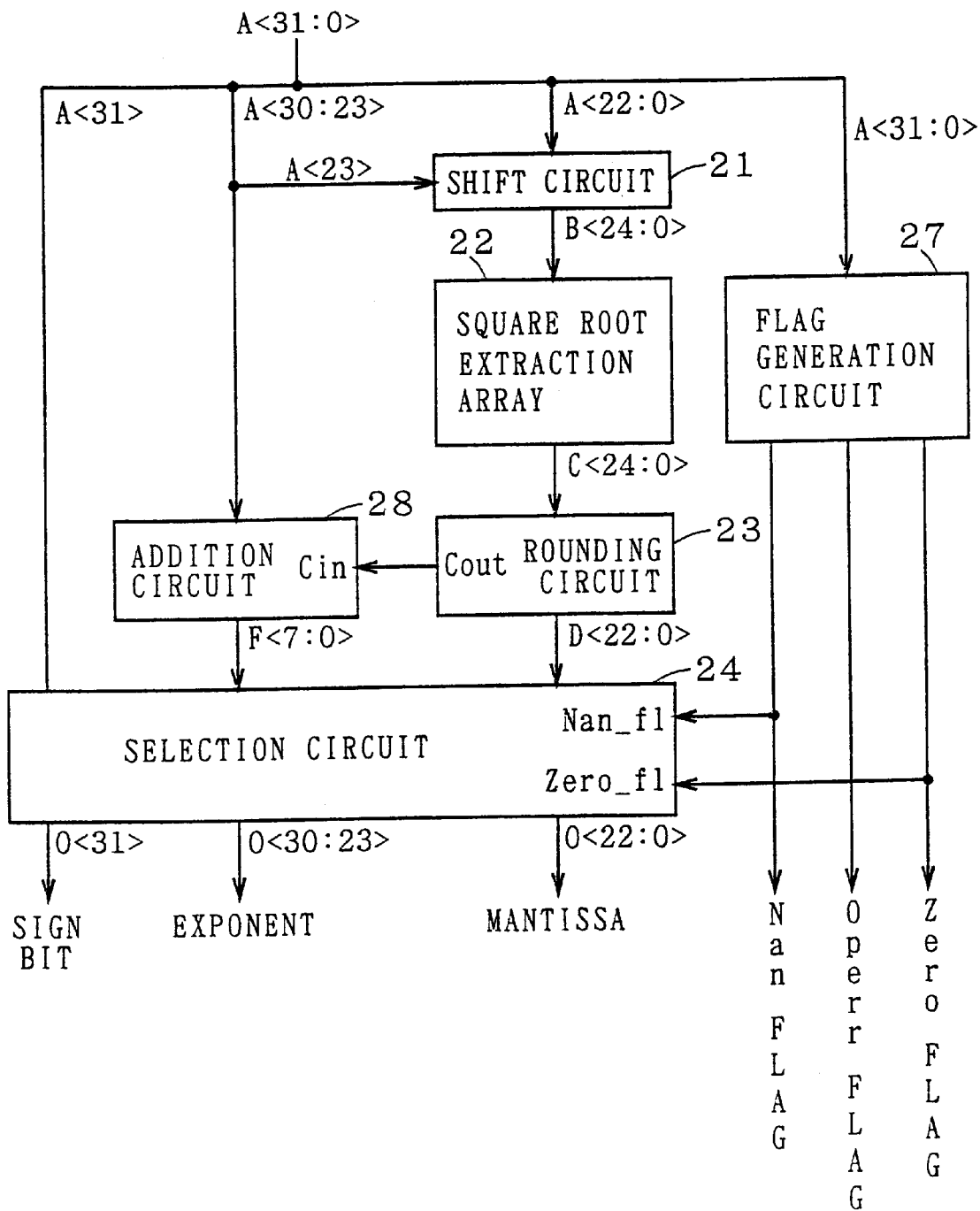
FIG. 18 is a block diagram of the floating-point square root extraction device according to a sixth preferred embodiment of the present invention.

FIG. 18 is a block diagram of the floating-point square root extraction device according to a sixth preferred embodiment of the present invention. As shown, the floating-point square root extraction device of the sixth preferred embodiment differs from that of the fifth preferred embodiment in that an addition circuit 28 is provided in place of the exponent square root extraction circuit 25 and the addition circuit 26.

The floating-point square root extraction device of the sixth preferred embodiment is similar in processing of the exponent to that of the fifth preferred embodiment. In the square root extraction operation, the square root of the exponent A<30:23> is extracted merely by multiplying the exponent by ½ when the exponent is an even number.

In the IEEE754 standard, a 23-bit fraction part is indicated as the mantissa, and the presence of an inleger part "1" is implied (in the case of a normalized number). The sixth preferred embodiment shall treat only normalized numbers for purposes of simplification since it is sufficient to treat the normalized numbers in an application which does not give much importance to operation errors, such as graphics application; for treatment of unnormalized numbers, a circuit arrangement is employed such that the unnormalized numbers are subjected to approximation to zero data and the results of operation are forced to be zero. An operation performed on unnormalized numbers results in unnormalized numbers. Thus, the sixth preferred embodiment forces the output to be "0" when unnormalized numbers are inputted. The operation of the unnormalized numbers differs from that of the normalized numbers in that the exponent is not processed. The operation of the mantissa of the unnormalized numbers is identical with that of the normalized numbers. Therefore, the concept of the sixth preferred embodiment may be applied to the basic structure/concept for the use of the unnormalized numbers.

Procedure of the processing performed on the exponent is as follows:

(1) An offset is subtracted. To shift the implied "1" to the fraction part, the offset is calculated: (127−1)=126. Then, the offset processing is performed: {A−126}.

(2) For ease of the extraction of the square root of the exponent, "1" is added to the exponent which is an odd number to provide an even number. That is, if A<23> is "1" (odd number), "1" is added to A<30:23>: {A−126+1}.

(3) The square root of the exponent is extracted. {{(A+p)−126}/2} (p=1/0 when A<23>=1/0).

(4) Addition (+126+Cin) is performed for returning from the offset. {(A+p)/2+63+Cin} (Cin is a carry input from the rounding circuit 23).

Figure 19:
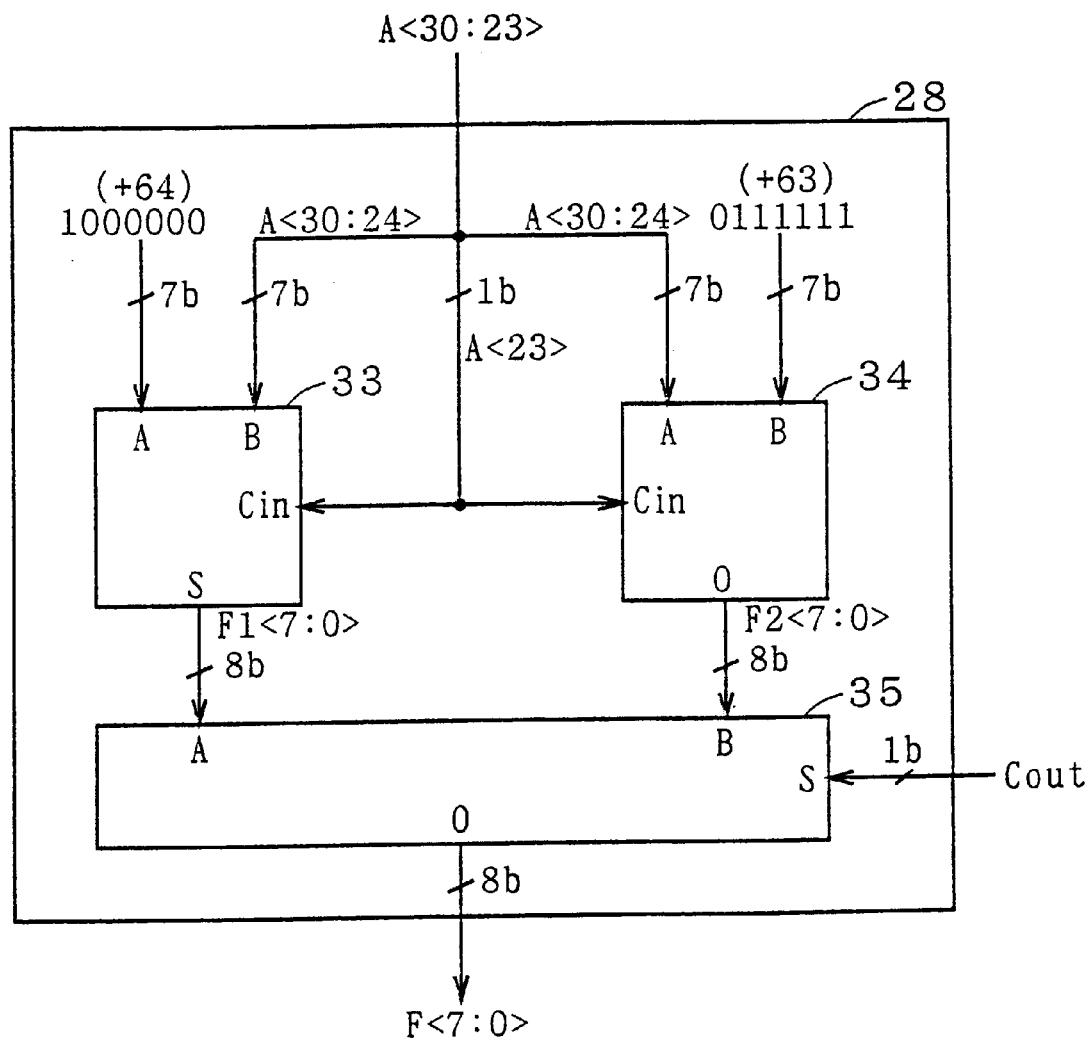
FIG. 19 is a block diagram showing the internal structure of an addition circuit shown in FIG. 18.

The addition circuit 28 of the sixth preferred embodiment is capable of performing the above described processings (1) to (4) simultaneously. FIG. 19 is a block diagram showing the internal structure of the addition circuit 28.

The addition circuit 28 comprises a partial addition circuit 33, a partial addition circuit 34, and a selection circuit 35. The partial addition circuits 33 and 34 are similar in internal construction to the exponent square root extraction circuit 25 shown in FIG. 16. The partial addition circuit 33 adds A<30:24> and "1000000" (64) together in consideration for the value of A<23> to output an 8-bit addition result F1<7:0>. The partial addition circuit 34 adds A<30:24> and "0111111" (63) together in consideration for the value of A<23> to output an 8-bit addition result F2<7:0>.

The selection circuit 35 outputs an addition result F<7:0> which is the output F1<7:0> from the partial addition circuit 33 when Cin from the rounding circuit 23 is "1" and which is the output F2<7:0> from the partial addition circuit 34 when Cin=0.

In this manner, the addition circuit 28 of the sixth preferred embodiment has the integral functions of the exponent square root extraction circuit 25 and the addition circuit 26 of the fifth preferred embodiment, simplifying the circuit arrangement and increasing the processing speed.

It is needless to say that the addition circuit 28 may be comprised of the CLA (Carry Lookahead Adder) or CSA (Carry Select Adder) type high-speed adders to increase the processing speed.

Seventh Preferred Embodiment

Figure 20:
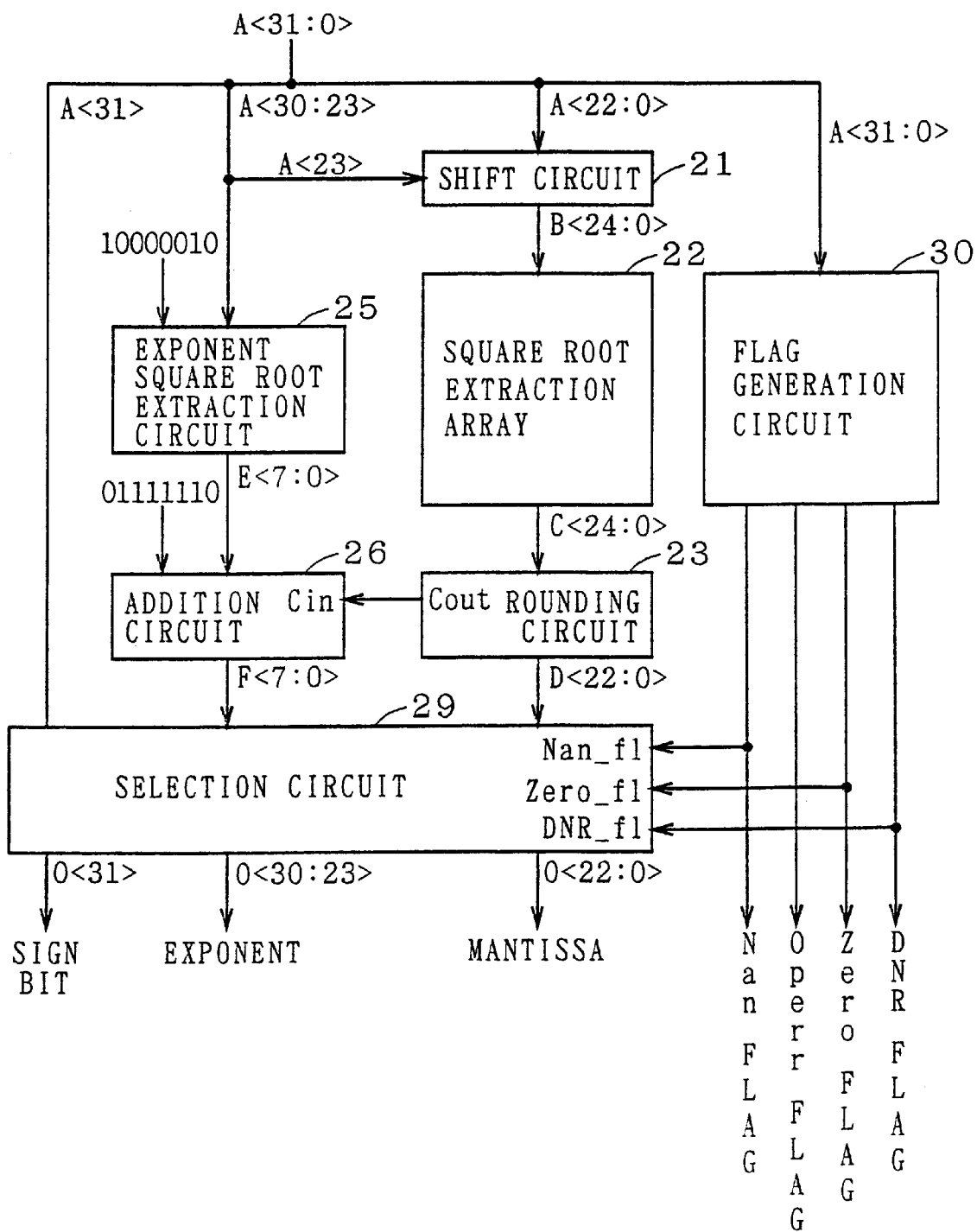
FIG. 20 is a block diagram of the floating-point square root extraction device according to a seventh preferred embodiment of the present invention.

FIG. 20 is a block diagram of the floating-point square root extraction device according to a seventh preferred embodiment of the present invention. The floating-point square root extraction device of the seventh preferred embodiment is similar in construction to that of the fifth preferred embodiment shown in FIG. 15 except a selection circuit 29 and a flag generation circuit 30. The difference from the fifth preferred embodiment is that the seventh preferred embodiment is capable of processing unnormalized numbers.

The operation performed on unnormalized numbers results in unnormalized numbers (or can be zero depending upon the operation accuracy). The seventh preferred embodiment performs the operation on the mantissa of the inputted unnormalized number in a similar manner to that of the normalized number. The difference is the processing of the exponent. When the unnormalized number is inputted, the exponent equals "0" (in the case of the IEEE754 standard). Then, the result of operation should be zero, and the operation performed on the normalized numbers is not required.

The flag generation circuit 30 further outputs a DNR (DeNoRmalization number) flag which is set when the input is the unnormalized number. The selection circuit 29 receives the DNR flag (indicating that the input is the unnormalized number) outputted from the flag generation circuit 30. When the DNR flag is set, the selection circuit 29 selects zero instead of the output F<7:0> from the addition circuit 26. The signt and mantissa of the unnormalized numbers are treated similarly to those of the normalized numbers.

In this manner, the floating-point square root extraction device of the seventh preferred embodiment allows the unnormalized numbers to be processed by the same hardware to perform a more general-purpose accurate floating-point square root extraction operation.

Eighth Preferred Embodiment

Figure 21:
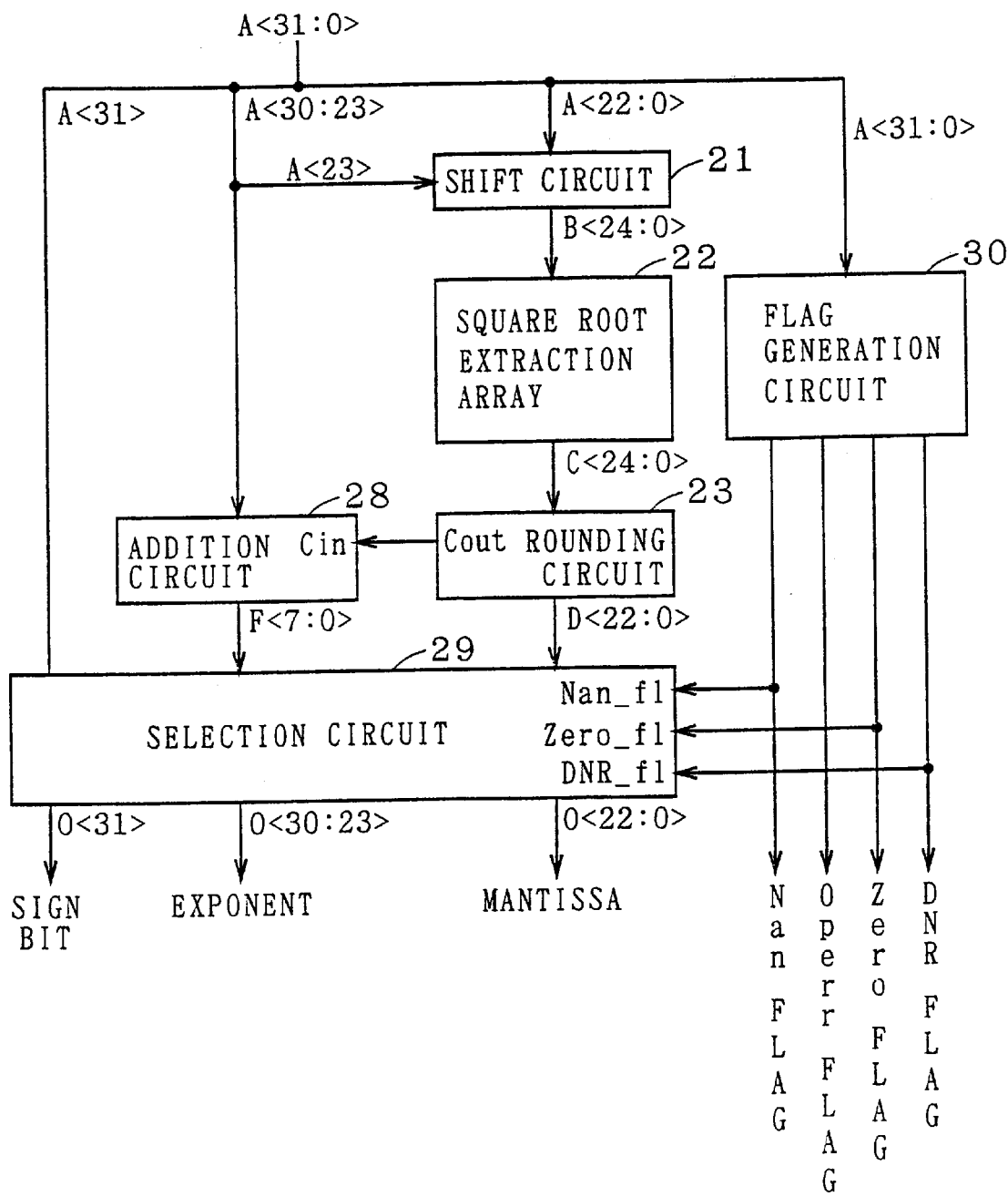
FIG. 21 is a block diagram of the floating-point square root extraction device according to an eighth preferred embodiment of the present invention.
Figure 22:
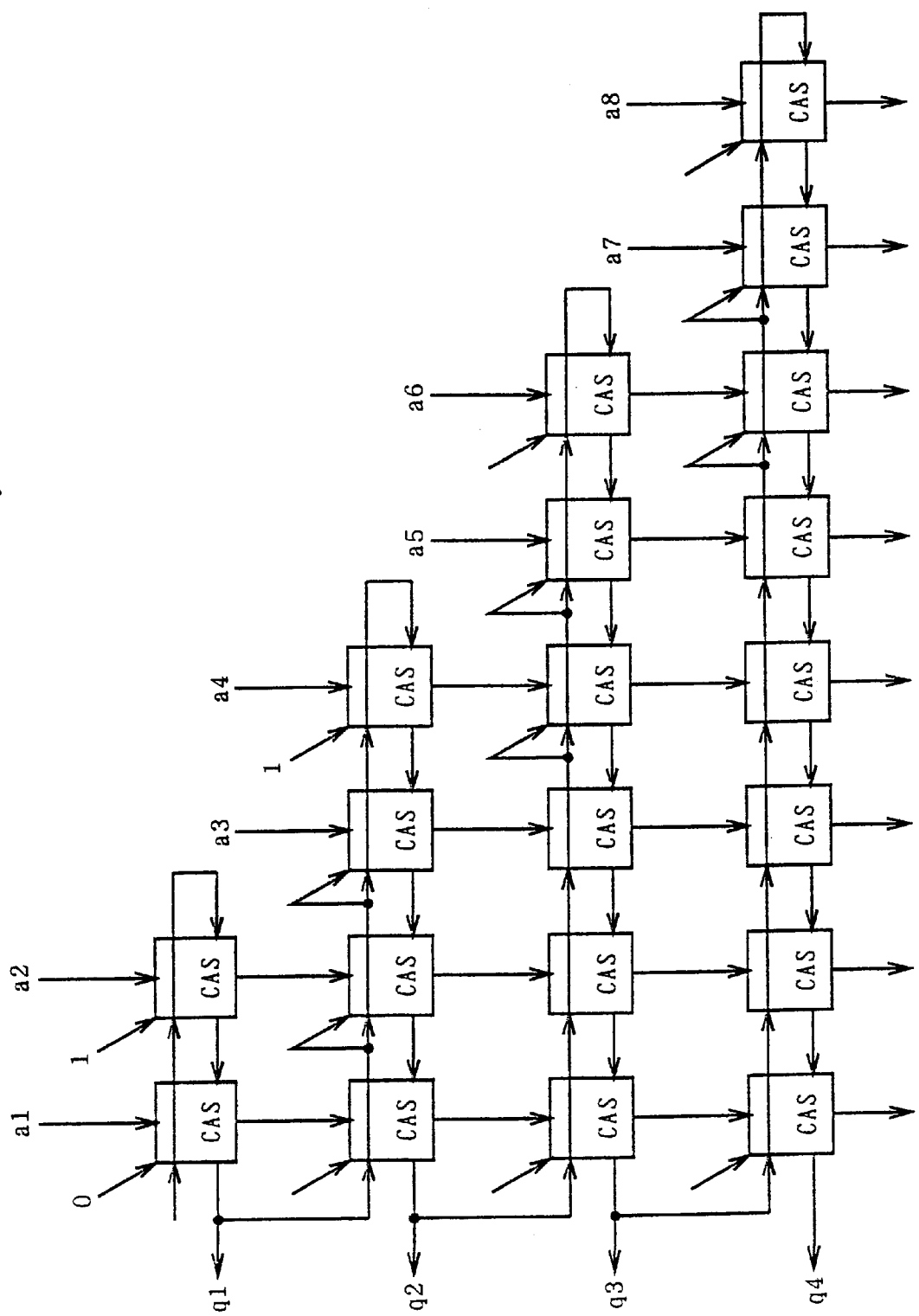
FIG. 22 is a block diagram of a conventional square root extraction circuit.

FIG. 21 is a block diagram of the floating-point square root extraction device according to an eighth preferred embodiment of the present invention. The floating-point square root extraction device of the eighth preferred embodiment is similar in construction to that of the sixth preferred embodiment shown in FIG. 18 except the selection circuit 29 and the flag generation circuit 30. The difference from the sixth preferred embodiment is that the eighth preferred embodiment is capable of processing unnormalized numbers.

The flag generation circuit 30 further outputs the DNR flag which is set when the input is the unnormalized number. The selection circuit 29 receives the DNR flag (indicating that the input is the unnormalized number) outputted from the flag generation circuit 30. When the DNR flag is set, the selection circuit 29 selects zero instead of the output F<7:0> from the addition circuit 26. The sign and mantissa of the unnormalized numbers are treated similarly to those of the normalized numbers.

In this manner, the floating-point square root extraction device of the eighth preferred embodiment allows the unnormalized numbers to be processed by the same hardware to perform a more general-purpose accurate floating-point square root extraction operation.

While the invention has been described in detail, the foregoing description is in all aspects illustrative and not restrictive. It is understood that numerous other modifications and variations can be devised without departing from the scope of the invention.

We claim:

1. A square root extraction circuit for calculating binary input data $(0.a(1)\ a(2)\ a(3)\ \ldots\ a(n))$ using a square root extraction algorithm to output binary square root data $(0.q(1)\ q(2)\ q(3)\ \ldots\ q(m))$, said square root extraction algorithm including an algorithm for determining said square root data on the basis of said input data by only additions of square root partial data $q(1)$ to $q(m)$ in $q(1)$ to $q(m)$ order, said algorithm having preceding digit based operation portions for performing operations to output said square root partial data $q(2)$ to $q(m)$ by using said square root partial data $q(1)$ to $q(m-1)$ provided in their preceding digit positions as operation parameters, said square root extraction circuit comprising:

first to mth digit calculating portions including at least first to mth adder groups, respectively, each of said first to mth adder groups including a plurality of adders connected in series so that carries are propagated therethrough, wherein respective ones of said adders which are connected in the last position in said first to (p−1)th digit calculating portions $(2 \leq p \leq m)$ provide carry outputs serving as said square root partial data $q(1)$ to $q(p-1)$, respectively, in accordance with said square root extraction algorithm, and wherein said preceding digit based operation portions of said pth to mth digit calculating portions include carry output prediction circuits for performing logic operations based on the carry outputs from respective ones of said adders which are connected in the last position in the adder groups thereof and said square root partial data $q(p-1)$ to $q(m-1)$ provided in their preceding digit positions to output said square root partial data $q(p)$ to $q(m)$, respectively.

2. The square root extraction circuit in accordance with claim 1, further comprising:

a rounding circuit for rounding square root data $(0.q(1)\ q(2)\ q(3)\ \ldots\ q(k-1))$ $(p \leq k \leq m)$ based on said square root partial data $q(k)$ to $q(m)$ outputted from said carry output prediction circuits of said kth to mth digit calculating portions to output rounded square root data $(0.r(1)\ r(2)\ r(3)\ \ldots\ r(k-1))$.

3. The square root extraction circuit in accordance with claim 1, wherein each of said second to mth adder groups comprises at least a pair of adders receiving respective external data, and at least a pair of adders each having a first input receiving an addition result from an adder included in an adder group provided in its preceding digit position, said two pairs of adders being connected in series so that carries are propagated therethrough, wherein said carry output prediction circuit of said pth digit calculating portion performs a logic operation based on addition result information containing information associated with at least an addition result from the adder connected in the last position in the (p−1)th adder group in addition to the carry output from the adder connected in the last position in the pth adder group and the square root partial data $q(p-1)$ provided in its preceding digit position, thereby to output the square root partial data $q(p)$ and addition result information of the pth digit calculating portion, and wherein said carry output prediction circuit of the ith digit calculating portion $((p+1) \leq i \leq m)$ performs a logic operation based on an addition result from the adder connected in the last position in the (i−1)th adder group and the addition result information of the (i−1)th digit calculating portion in addition to the carry output from the adder connected in the last position in the ith adder group and the square root partial data $q(i-1)$ provided in its preceding digit position, thereby to output the square root partial data $q(i)$ and addition result information of the ith digit calculating portion.

4. The square root extraction circuit in accordance with claim 3, wherein said carry output prediction circuit of the ith digit calculating portion $((p+1) \leq i \leq m)$ comprises:

logic operation means for performing the logic operation based on the addition result from the adder connected in the last position in the (i−1)th adder group and the addition result information of the (i−1)th digit calculating portion to output a plurality of logic results; and selection means for selectively outputting one of said logic results as said square root partial data $q(i)$ and another one of said logic results as the addition result information of the ith digit calculating portion on the basis of the carry output from the adder connected in the last position in the ith adder group and the square root partial data q(i−1) provided in its preceding digit position.

5. The square root extraction circuit in accordance with claim 4,
wherein said selection means receives the carry output having a negative logic from the adder connected in the last position in the ith adder group.

6. The square root extraction circuit in accordance with claim 1,
wherein each of said second to mth adder groups comprises at least a pair of adders receiving respective external data, and at least a pair of adders each having a first input receiving an addition result from an adder included in an adder group provided in its preceding digit position, said two pairs of adders being connected in series so that carries are propagated therethrough,
wherein said carry output prediction circuit of said pth digit calculating portion performs a logic operation based on addition result information containing information associated with at least an addition result from the adder connected in the last position in the (p−1)th adder group in addition to the carry output from the adder connected in the last position in the pth adder group and the square root partial data q(p−1) provided in its preceding digit position, thereby to output the square root partial data q(p) and addition result information of the pth digit calculating portion,
wherein said carry output prediction circuit of the ith digit calculating portion $((p+1) \leq i \leq (m-1))$ performs a logic operation based on an addition result from the adder connected in the last position in the (i−1)th adder group and the addition result information of the (i−1)th digit calculating portion in addition to the carry output from the adder connected in the last position in the ith adder group and the square root partial data q(i−1) provided in its preceding digit position, thereby to output the square root partial data q(i) and addition result information of the ith digit calculating portion, and
wherein said carry output prediction circuit of the mth digit calculating portion performs a logic operation based on an addition result from the adder connected in the last position in the mth adder group and the addition result information of the (m−1)th digit calculating portion in addition to the carry output from the adder connected in the last position in the (m−1)th adder group and the square root partial data q(m−1) provided in its preceding digit position, thereby to output only the square root partial dalta q(m).

7. The square root extraction circuit in accordance with claim 1,
wherein said square root extraction algorithm includes a step for adding fixed values to be added, and
wherein a fixed addition result is directly applied to an adder in each of said first to mth digit calculating portions without using an adder for adding said fixed values.

8. A floating-point square root extraction device for performing a square root extraction operation on floating-point input data including a mantissa and an exponent to output floating-point output data, comprising:
exponent square root extraction means receiving exponent input data for performing the square root extraction operation on said exponent input data to output exponent square root data;
a square root extraction circuit for calculating binary input data associated with mantissa input data (0.a(1) a(2) a(3) . . . a(n)) using a square root extraction algorithm to output mantissa square root data ((0.q(1) q(2) q(3) . . . q(m)), said square root extraction algorithm including an algorithm for determining said mantissa square root data on the basis of said input data by only additions of square root partial data q(1) to q(m) in q(1) to q(m) order, said algorithm having preceding digit based operation portions for performing operations to output said square root partial data q(2) to q(m) by using said square root partial data q(1) to q(m−1) provided in their preceding digit positions as operation parameters,
said square root extraction circuit comprising first to mth digit calculating portions including at least first to mth adder groups, respectively, each of said first to mth adder groups including a plurality of adders connected in series so that carries are propagated therethrough, wherein respective ones of said adders which are connected in the last position in said first to (p−1)th digit calculating portions $(2 \leq p \leq m)$ provide carry outputs serving as said square root partial data q(1) to q(p−1), respectively, in accordance with said square root extraction algorithm, and wherein said preceding digit based operation portions of said pth to mth digit calculating portions include carry output prediction circuits for performing logic operations based on the carry outputs from respective ones of said adders which are connected in the last position in the adder groups thereof and said square root partial data q(p−1) to q(m−1) provided in their preceding digit positions to output said square root partial data q(p) to q(m), respectively,
said floating-point square root extraction device further comprising
floating-point data output means for outputting said floating-point output data including exponent output data and mantissa output data on the basis of said exponent square root data and said mantissa square root data.

9. The floating-point square root extraction device in accordance with claim 8,
wherein said floating-point data output means includes output selection means receiving input data information indicating whether said floating-point input data is a normalized number or an unnormalized number, said output selection means for forcing said exponent output data to be "0" to output only said mantissa output data as said floating-point output data when said input data information indicates the unnormalized number.

10. The floating-point square root extraction device in accordance with claim 8, further comprising:
data shift means for performing a predetermined data shift processing on said mantissa input data to apply the resultant data as said binary input data to said square root extraction circuit when said exponent input data is an odd number,
wherein said exponent square root extraction means includes:
preliminary exponent square root extraction portion for performing a predetermined change-to-even-number processing on said exponent input data to provide an even number when said exponent input data is an odd number, said preliminary exponent square root extraction portion thereafter dividing the even number by 2 to output preliminary exponent square root data, said change-to-even-number processing and said predetermined data shift processing being performed so that the value of the floating-point input data is not changed, and an exponent square root data output portion for modifying said preliminary exponent square root data on the basis of rounding-based carry information to output said exponent square root data, and wherein said floating-point data output means includes mantissa data rounding means for rounding more significant digits of said mantissa square root data on the basis of a less significant digit of said mantissa square root data to output said mantissa output data and to output said rounding-based carry information indicating whether or not said mantissa square root data has a carry during rounding.

11. The floating-point square root extraction device in accordance with claim 10, wherein said preliminary exponent square root extraction portion and said exponent square root data output portion are formed integrally.

\* \* \* \* \*